(12) United States Patent
Asano et al.

(10) Patent No.: US 12,209,671 B2
(45) Date of Patent: Jan. 28, 2025

(54) VALVE DEVICE

(71) Applicant: DENSO CORPORATION, Kariya (JP)

(72) Inventors: Naoki Asano, Kariya (JP); Ryo Sano, Kariya (JP); Atsushi Tanaka, Kariya (JP); Takehito Mizunuma, Kariya (JP); Takuya Hamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 127 days.

(21) Appl. No.: 18/295,401

(22) Filed: Apr. 4, 2023

(65) Prior Publication Data

US 2023/0243432 A1 Aug. 3, 2023

Related U.S. Application Data

(63) Continuation of application No. PCT/JP2021/035042, filed on Sep. 24, 2021.

(30) Foreign Application Priority Data

Oct. 6, 2020 (JP) .................................. 2020-169239

(51) Int. Cl.
  *F16K 11/074* (2006.01)
  *F16K 3/08* (2006.01)
  *F16K 31/04* (2006.01)

(52) U.S. Cl.
  CPC .............. *F16K 11/074* (2013.01); *F16K 3/08* (2013.01); *F16K 31/043* (2013.01)

(58) Field of Classification Search
  CPC .... F16K 11/074; F16K 31/535; F16K 31/041; F16K 3/08–085
  See application file for complete search history.

(56) References Cited

U.S. PATENT DOCUMENTS

2019/0301619 A1   10/2019   Wu et al.
2021/0053018 A1*  2/2021    Dyer ..................... F16K 11/074

FOREIGN PATENT DOCUMENTS

JP          2018-40384          3/2018

OTHER PUBLICATIONS

U.S. Appl. No. 18/194,220 to Takehito Mizunuma, filed Mar. 31, 2023 (49 pages).

* cited by examiner

*Primary Examiner* — Marina A Tietjen
(74) *Attorney, Agent, or Firm* — Nixon & Vanderhye P.C.

(57) ABSTRACT

A valve device includes a housing, a stationary valve and a drive valve. The stationary valve is placed in a fluid passage of the housing. The stationary valve forms a first passage, which conducts fluid, and a penetrating chamber which penetrates through the stationary valve in the axial direction. The drive valve is placed on one axial side of the stationary valve in the fluid passage and forms a second passage which conducts the fluid. The drive valve communicates the second passage to the first passage through rotation of the drive valve. The housing has a bottom portion that covers the penetrating chamber from another axial side. An upstream passage of the fluid passage, which is located on an upstream side of the drive valve and the stationary valve in a flow direction of the fluid, is communicated with the penetrating chamber through a communication passage.

19 Claims, 18 Drawing Sheets

VALVE DEVICE

CROSS REFERENCE TO RELATED APPLICATIONS

This application is a continuation application of International Patent Application No. PCT/JP2021/035042 filed on Sep. 24, 2021, which designated the U.S. and claims the benefit of priority from Japanese Patent Application No. 2020-169239 filed on Oct. 6, 2020. The entire disclosures of all of the above applications are incorporated herein by reference.

TECHNICAL FIELD

The present disclosure relates to a valve device.

BACKGROUND

Previously, there has been proposed a valve device which has a first valve plate and a second valve plate placed in a fluid passage in a housing.

The first valve plate forms a first through-hole and a second through-hole. The second valve plate forms a third through-hole. The second valve plate is placed on one side of the first valve plate in an axial direction.

The second valve plate communicates the third through-hole to at least one of the first through-hole and the second through-hole through rotation of the second valve plate about an axis thereof. For example, when the third through-hole is communicated with the first through-hole, the fluid is discharged from a first outlet port through the third through-hole and the first through-hole. When the third through-hole is communicated with the second through-hole, the fluid is discharged from a second outlet port through the third through-hole and the second through-hole.

Thus, by rotating the second valve plate, the outlet port, from which the fluid is discharged, can be changed from one of the first outlet port and the second outlet to the other one of the first outlet port and the second outlet port.

SUMMARY

This section provides a general summary of the disclosure, and is not a comprehensive disclosure of its full scope or all of its features.

According to the present disclosure, there is provided a valve device that includes a housing, a stationary valve and a drive valve. The housing forms a fluid passage configured to conduct fluid. The stationary valve is placed in the fluid passage and has an axis while an extending direction of the axis is defined as an axial direction. The stationary valve forms a first passage, which is configured to conduct the fluid, and a penetrating chamber which penetrates through the stationary valve in the axial direction. The drive valve is placed on one axial side of the stationary valve in the axial direction in the fluid passage and forms a second passage which is configured to conduct the fluid. The drive valve is configured to communicate the second passage to the first passage through rotation of the drive valve about the axis while the drive valve slides relative to the stationary valve. The housing has a bottom portion that is configured to cover the penetrating chamber from another axial side in the axial direction.

In the valve device, an upstream passage of the fluid passage, which is located on an upstream side of the drive valve and the stationary valve in a flow direction of the fluid, may be communicated with the penetrating chamber through a communication passage. Alternatively or additionally, a downstream passage of the fluid passage, which is located on a downstream side of the drive valve and the stationary valve in a flow direction of the fluid, may be communicated with the penetrating chamber through a communication passage.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
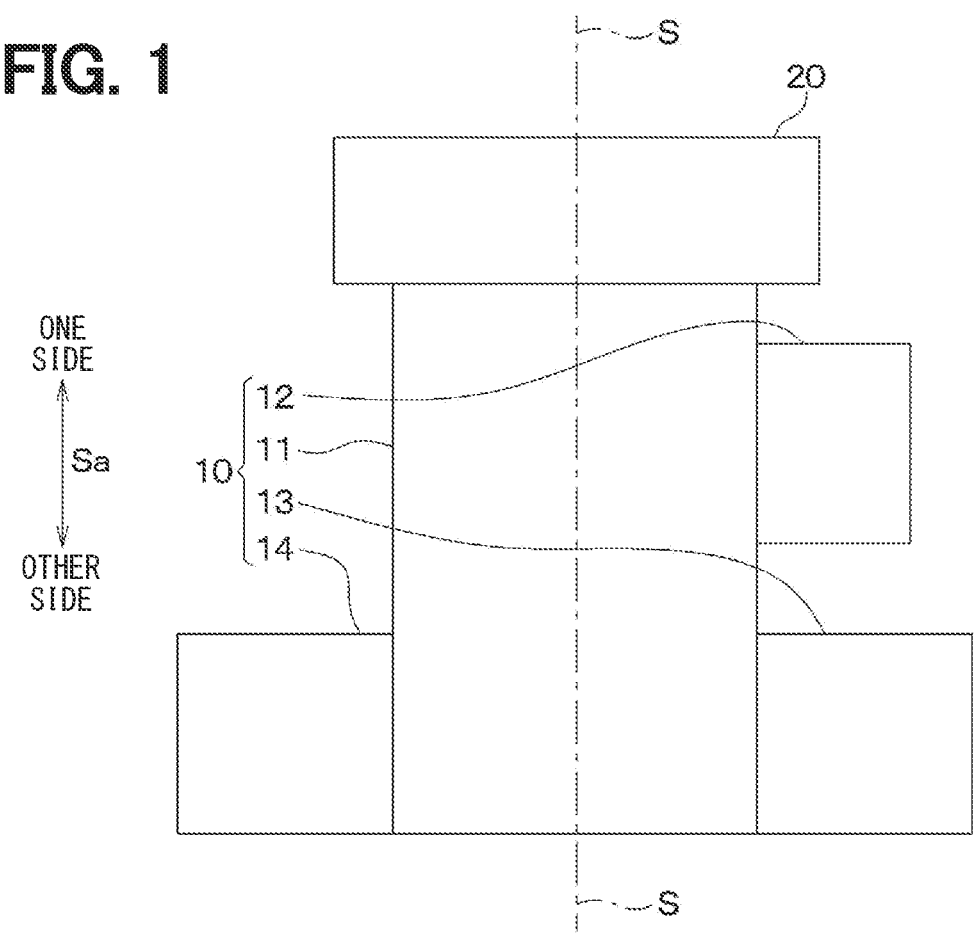
FIG. 1 is a front view of a valve device of a first embodiment viewed from an outer side of the valve device in a radial direction of an axis.

Previously, there has been proposed a valve device which has a first valve plate and a second valve plate placed in a fluid passage in a housing.

The first valve plate forms a first through-hole and a second through-hole. The second valve plate forms a third through-hole. The second valve plate is placed on one side of the first valve plate in an axial direction.

The second valve plate communicates the third through-hole to at least one of the first through-hole and the second through-hole through rotation of the second valve plate about an axis thereof. For example, when the third through-hole is communicated with the first through-hole, the fluid is discharged from a first outlet port through the third through-hole and the first through-hole. When the third through-hole is communicated with the second through-hole, the fluid is discharged from a second outlet port through the third through-hole and the second through-hole.

Thus, by rotating the second valve plate, the outlet port, from which the fluid is discharged, can be changed from one of the first outlet port and the second outlet to the other one of the first outlet port and the second outlet port.

The inventors of the present application have focused on reducing a frictional force between the first valve plate and the second valve plate in the above-described valve device and have studied as follows.

According to the study of the inventors of the present application, it is conceivable to form a fourth through-hole penetrating in the axial direction besides the first through-hole and the second through-hole in order to reduce the frictional force between the first valve plate and the second valve plate.

In a case where the first valve plate is supported by a bottom portion of the housing from the other side in the axial direction, the following disadvantage may occur. The fourth through-hole forms a sealed region that is surrounded by: a hole forming portion of the first valve plate which forms the fourth through-hole; the second valve plate; and the bottom portion of the housing.

In a case where the air is sealed in the sealed region, at a high temperature, the air in the sealed region expands to displace the second valve plate toward the one side in the axial direction. Therefore, a gap is formed between the second valve plate and the first valve plate. In contrast, at a low temperature, the air in the sealed region shrinks to pull the second valve plate toward the other side in the axial direction. Therefore, the frictional force between the first valve plate (i.e., a stationary valve) and the second valve plate (i.e., a drive valve) is increased.

According to one aspect of the present disclosure, there is provided a valve device including:

a housing that forms a fluid passage configured to conduct fluid;

a stationary valve that is placed in the fluid passage and has an axis while an extending direction of the axis is defined as an axial direction, wherein the stationary valve forms a first passage, which is configured to conduct the fluid, and a penetrating chamber which penetrates through the stationary valve in the axial direction; and a drive valve that is placed on one axial side of the stationary valve in the axial direction in the fluid passage and forms a second passage which is configured to conduct the fluid, wherein the drive valve is configured to communicate the second passage to the first passage through rotation of the drive valve about the axis while the drive valve slides relative to the stationary valve, wherein:

the housing has a bottom portion that is configured to cover the penetrating chamber from another axial side in the axial direction; and an upstream passage of the fluid passage, which is located on an upstream side of the drive valve and the stationary valve in a flow direction of the fluid, is communicated with the penetrating chamber through a communication passage.

With this configuration, by providing the penetrating chamber, a size of a sliding surface between the stationary valve and the drive valve can be reduced. In addition to this, the communication passage communicates between the upstream passage and the penetrating chamber.

Therefore it is possible to provide the valve device which eliminates the sealed region while reducing the frictional force between the stationary valve and the drive valve.

Furthermore, according to another aspect of the present disclosure, there is provided a valve device including:

a housing that forms a fluid passage configured to conduct fluid;

a stationary valve that is placed in the fluid passage and has an axis while an extending direction of the axis is defined as an axial direction, wherein the stationary valve forms a first passage, which is configured to conduct the fluid, and a penetrating chamber which penetrates through the stationary valve in the axial direction; and a drive valve that is placed on one axial side of the stationary valve in the axial direction in the fluid passage and forms a second passage which is configured to conduct the fluid, wherein the drive valve is configured to communicate the second passage to the first passage through rotation of the drive valve about the axis while the drive valve slides relative to the stationary valve, wherein:

the housing has a bottom portion that is configured to cover the penetrating chamber from another axial side in the axial direction; and a downstream passage of the fluid passage, which is located on a downstream side of the drive valve and the stationary valve in a flow direction of the fluid, is communicated with the penetrating chamber through a communication passage.

With this configuration, by providing the penetrating chamber, a size of a sliding surface between the stationary valve and the drive valve can be reduced. In addition to this, the communication passage communicates between the downstream passage and the penetrating chamber.

Therefore, it is possible to provide the valve device which eliminates the sealed region while reducing the frictional force between the stationary valve and the drive valve.

Hereinafter, embodiments of the present disclosure will be described with reference to the drawings. For the sake of simplicity of explanation, the same reference signs are assigned to the portions that are the same or equal to each other in the following respective embodiments.

First Embodiment

A valve device of a first embodiment will be described with reference to FIGS. 1 to 6. The valve device of the present embodiment is installed in a coolant circuit, in which coolant (fluid) is circulated. As shown in FIGS. 1 to 4, the valve device includes a housing 10, an actuator 20, a drive valve 30, a stationary valve 40, a gasket 50 and a spring 60.

Figure 2:
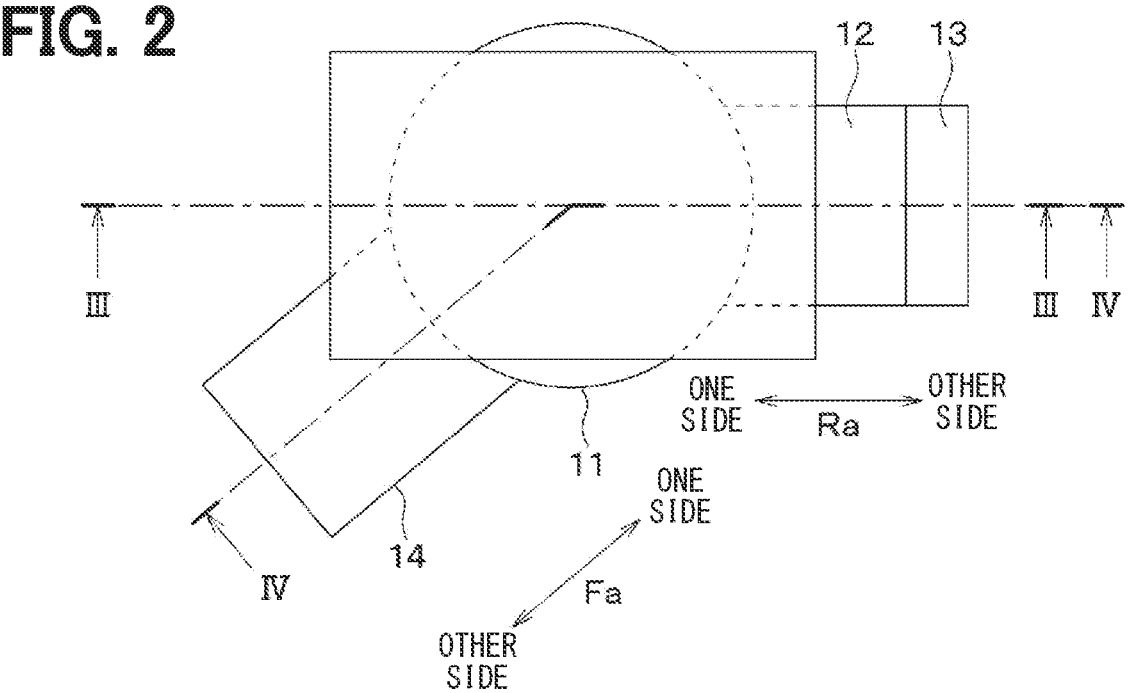
FIG. 2 is a top view of the valve device of the first embodiment shown in FIG. 1 viewed from one side in an axial direction.

As shown in FIGS. 1 and 2, the housing 10 includes a housing main body 11, an inlet pipe 12 and outlet pipes 13, 14.

Figure 3:
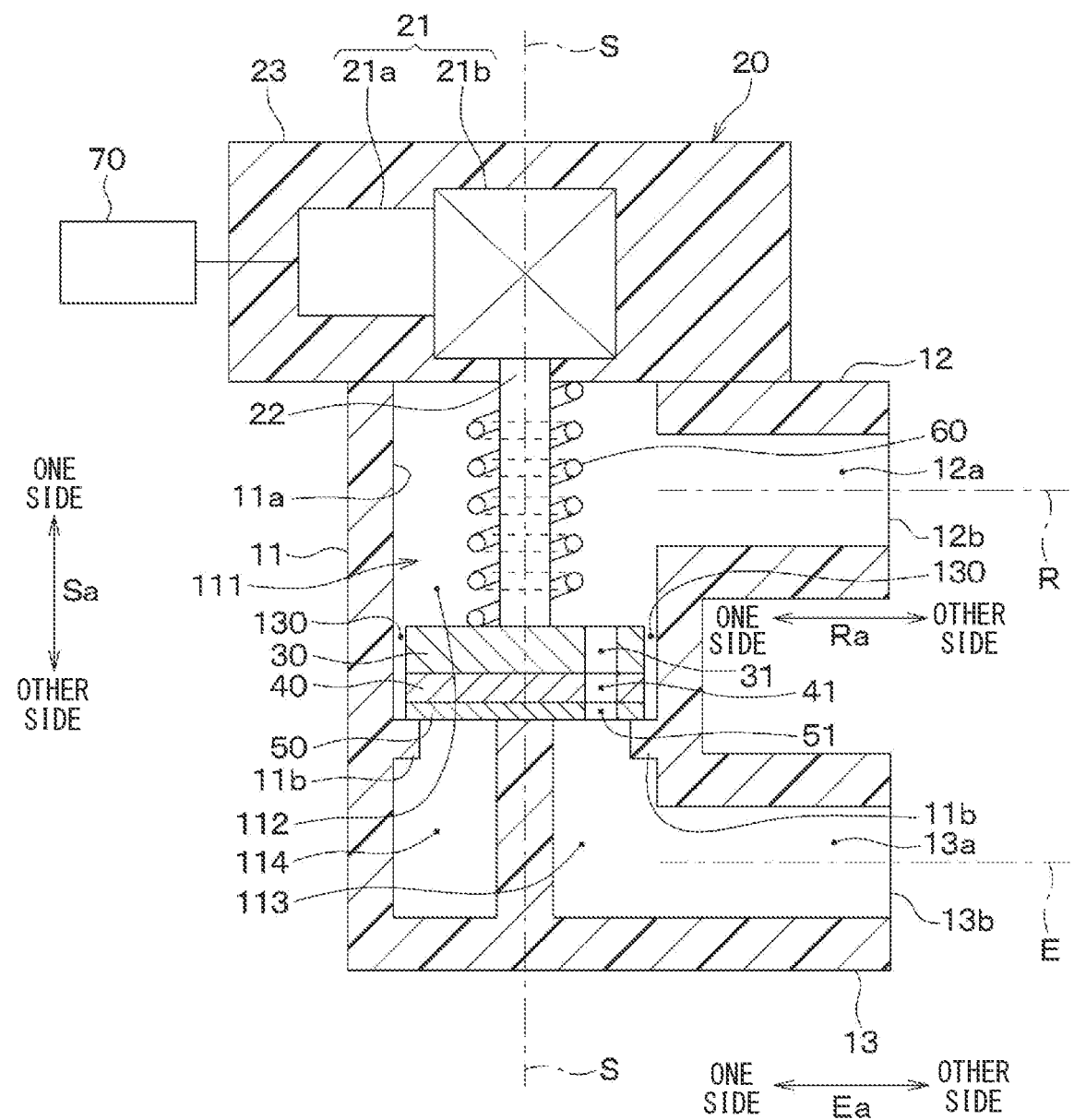
FIG. 3 is a cross-sectional view taken along line III-III in FIG. 2.
Figure 4:
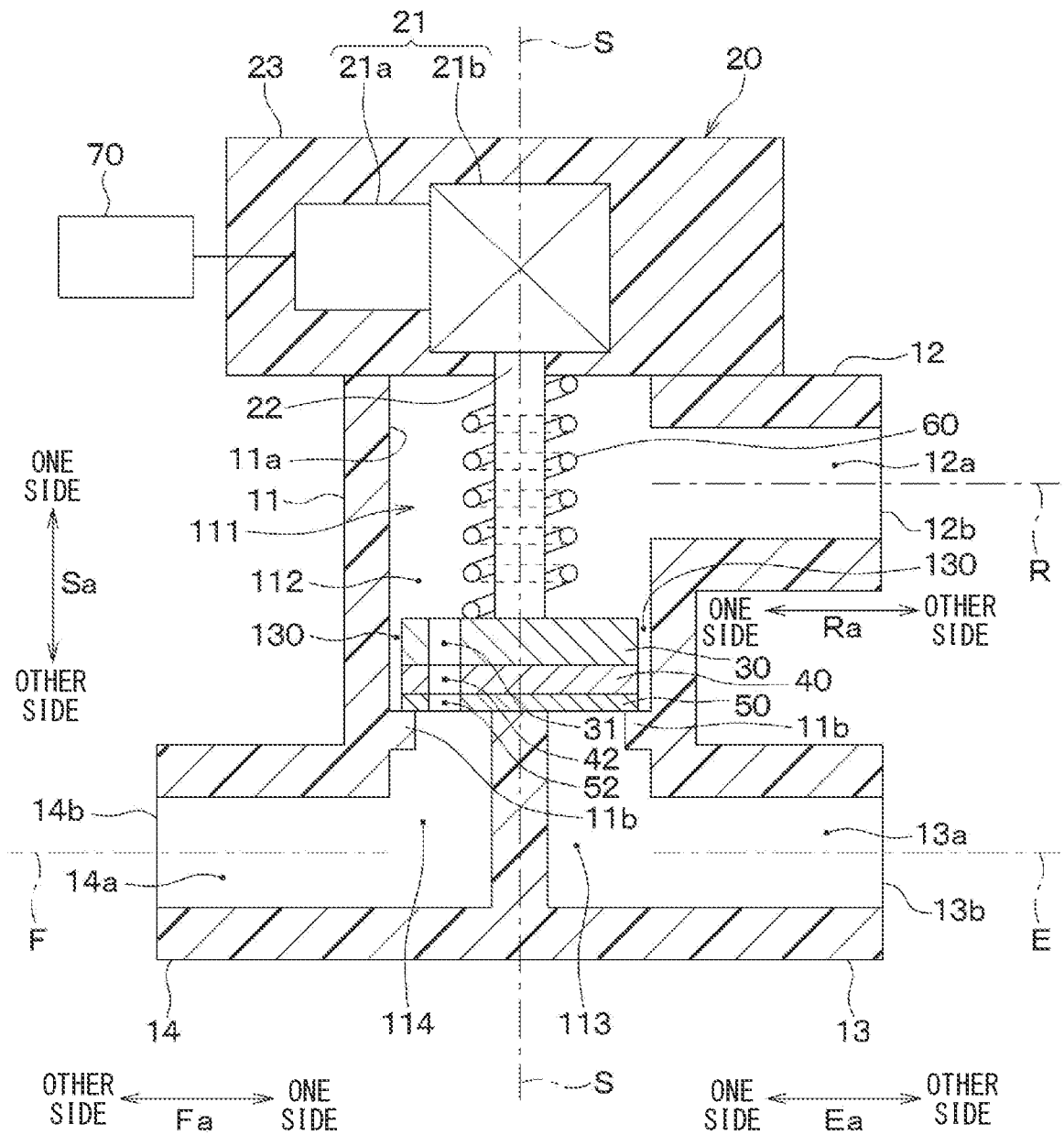
FIG. 4 is a cross-sectional view taken along line IV-IV in FIG. 2.

As shown in FIGS. 3 and 4, the housing main body 11 has an axis S and is shaped in a cylindrical tubular form which is centered on the axis S. The housing main body 11 forms a coolant passage 111 that forms a fluid passage configured to conduct the coolant.

The coolant passage 111 is formed by an inner wall 11a of the housing main body 11. Specifically, the coolant passage 111 includes an upstream passage 112 and downstream passages 113, 114. The upstream passage 112 is located on one side (also referred to as one axial side) of a bottom portion 110 of the housing main body 11 in an axial direction Sa. The upstream passage 112 is located on an upstream side of the drive valve 30 and the stationary valve 40 in a flow direction of the coolant in the coolant passage 111.

The upstream passage 112 is a passage that conducts the coolant, which is received from a pipe passage 12a of the inlet pipe 12, to the other side (also referred to as the other axial side) in the axial direction Sa. The axial direction Sa is an extending direction of the axis S of the housing main body 11. The pipe passage 12a of the inlet pipe 12 is connected to the upstream passage 112.

Figure 5:
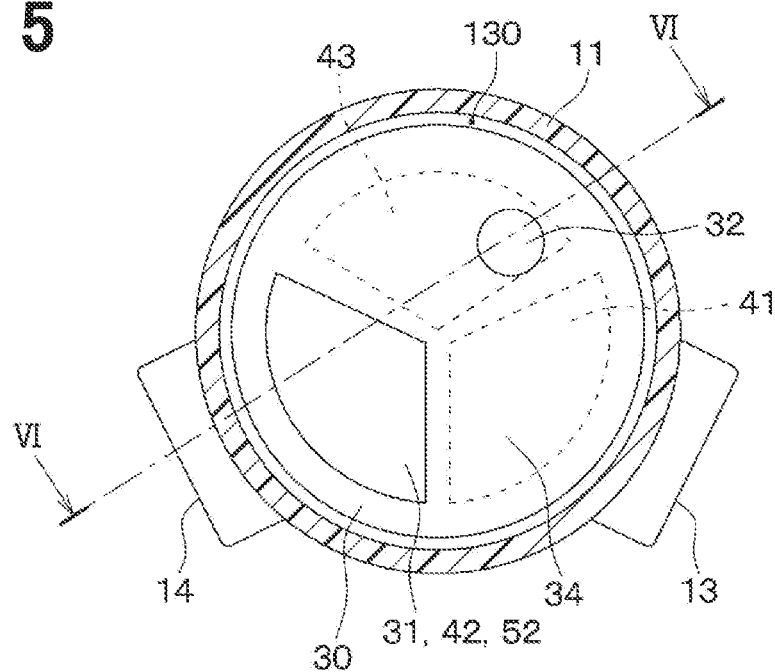
FIG. 5 is a view of a drive valve and a stationary valve in an inside of the valve device of the first embodiment shown in FIG. 3 viewed from the one side in the axial direction while a drive shaft and a spring are omitted.
Figure 6:
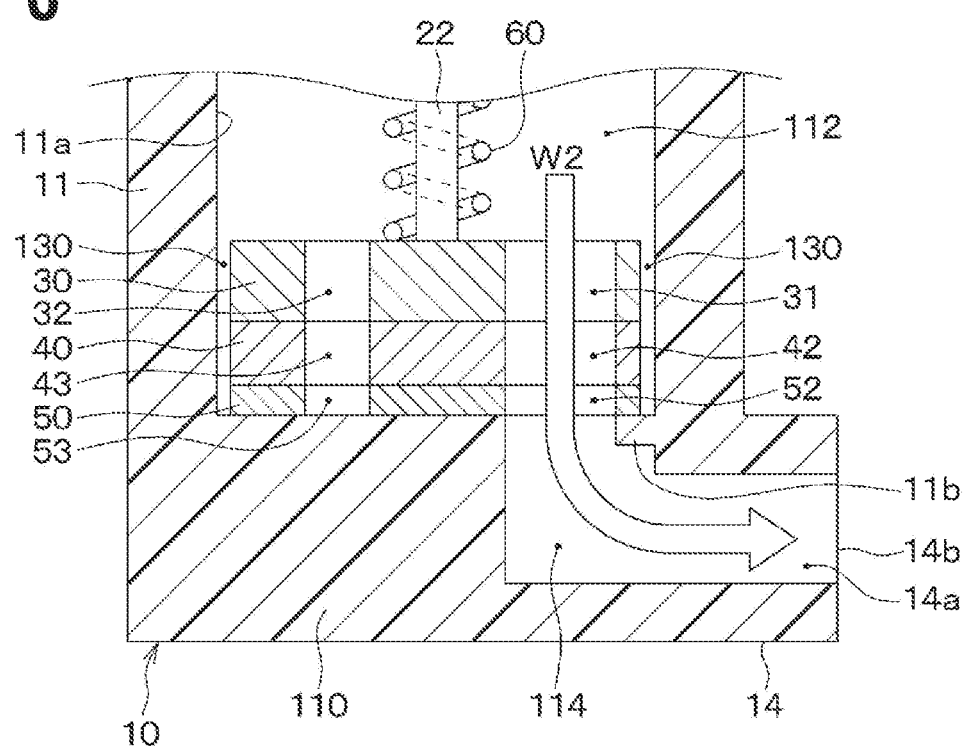
FIG. 6 is a cross-sectional view taken along line VI-VI in FIG. 5.
Figure 7:
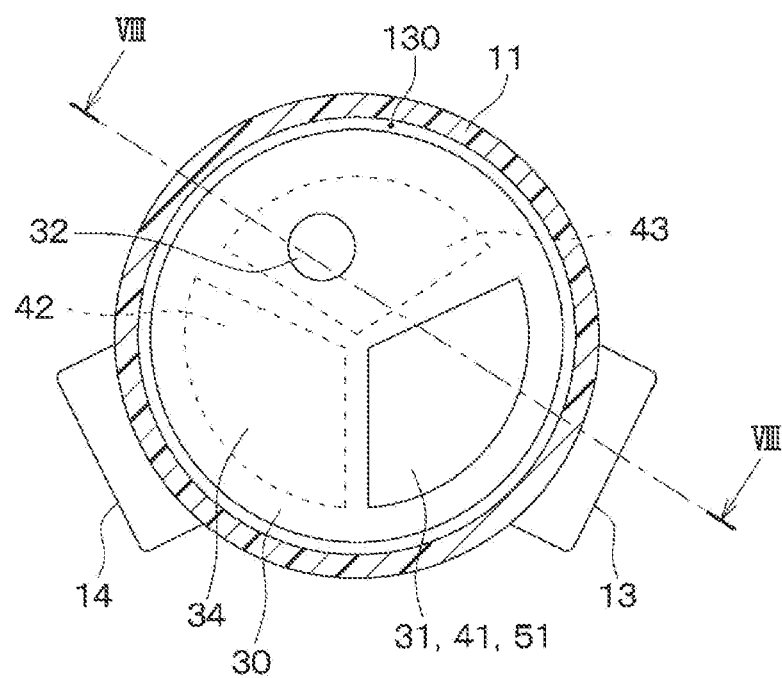
FIG. 7 is a view of the drive valve and the stationary valve in the inside of the valve device of the first embodiment shown in FIG. 3 viewed from the one side in the axial direction while the drive shaft and the spring are omitted.
Figure 8:
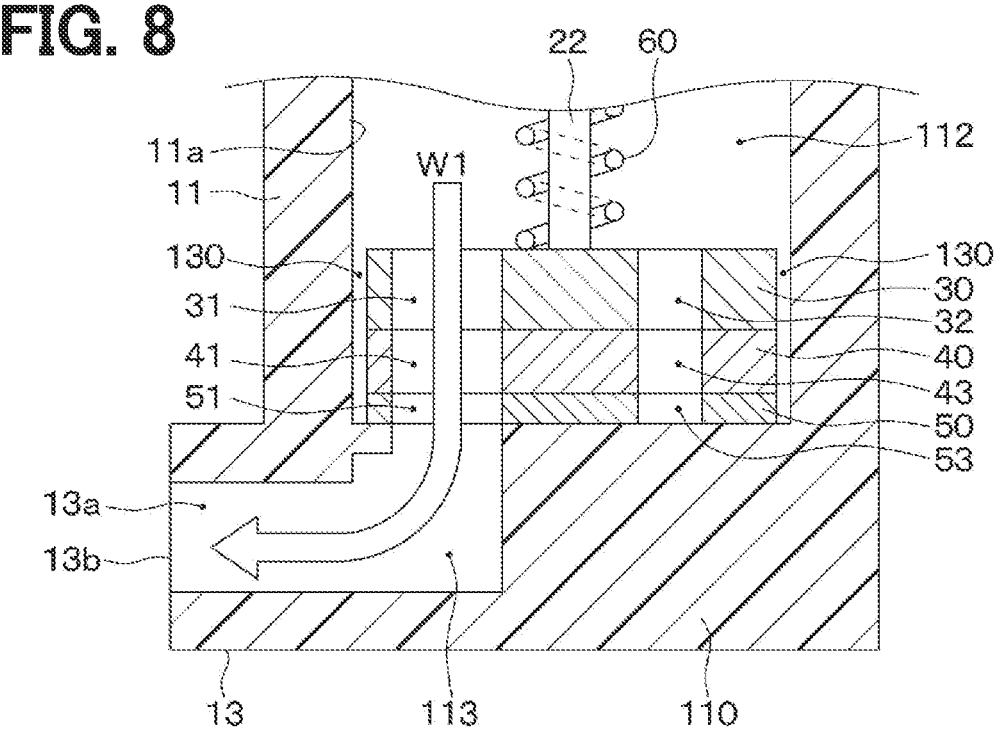
FIG. 8 is a cross-sectional view taken along line VIII-VIII in FIG. 7.

As shown in FIGS. 5 and 6, the downstream passage 114 is formed at the bottom portion 110. The downstream passage 114 is connected to a pipe passage 14a of the outlet pipe 14. As shown in FIGS. 7 and 8, the downstream passage 113 is formed at the bottom portion 110. The downstream passage 113 is connected to a pipe passage 13a of the outlet pipe 13.

As shown in FIGS. 6 and 8, in the housing main body 11, the bottom portion 110 is located on the other side of the upstream passage 112, the drive valve 30, the stationary valve 40 and the gasket 50 in the axial direction Sa.

The bottom portion 110 supports the stationary valve 40 through the gasket 50 from the other side in the axial direction Sa. The bottom portion 110 is formed to cover an opening 43 of the stationary valve 40.

As shown in FIG. 3 or FIG. 4, one side of the inlet pipe 12 directed toward one side in an axial direction Ra of the inlet pipe 12 is connected to one side of the housing main body 11 directed toward the one side in the axial direction Sa of the housing main body 11. The inlet pipe 12 is shaped in a cylindrical tubular form which is centered on an axis R of the inlet pipe 12.

The inlet pipe 12 forms the pipe passage 12a that conducts the coolant from the other side toward the one side in the axial direction Ra. The axial direction Ra is an extending direction of the axis R. The pipe passage 12a is communicated with the upstream passage 112.

As shown in FIGS. 3 and 4, an inlet port 12b is formed at the other side of the inlet pipe 12 in the axial direction Ra. The inlet port 12b is an inlet, through which the coolant flows into the pipe passage 12a. The axial direction Ra is the direction that is perpendicular to the axial direction Sa.

One side of the outlet pipe 13 directed toward one side in an axial direction Ea of the outlet pipe 13 is connected to the other side of the housing main body 11 directed toward the other side in the axial direction Sa of the housing main body 11. The outlet pipe 13 is shaped in a cylindrical tubular form which is centered on an axis E of the outlet pipe 13.

The outlet pipe 13 forms the pipe passage 13a that conducts the coolant from the one side toward the other side in the axial direction Ea. The axial direction Ea is an extending direction of the axis E. The pipe passage 13a is communicated with the downstream passage 113.

As shown in FIG. 3, an outlet port 13b is formed at the other side of the outlet pipe 13 in the axial direction Ea. The outlet port 13b is an outlet for discharging the coolant which has passed through the pipe passage 13a. The axial direction Ea is the direction that is parallel with the axial direction Ra.

As shown in FIG. 4, one side of the outlet pipe 14 directed toward one side in an axial direction Fa of the outlet pipe 14 is connected to the other side of the housing main body 11 directed toward the other side in the axial direction Sa. The outlet pipe 14 is shaped in a cylindrical tubular form which is centered on an axis F of the outlet pipe 14.

The outlet pipe 14 forms the pipe passage 14a which conducts the coolant from the one side toward the other side in the axial direction Fa. The axial direction Fa is an extending direction of an axis F of the outlet pipe 14. The pipe passage 14a is communicated with the downstream passage 114.

An outlet port 14b is formed at the other side of the outlet pipe 14 in the axial direction Fa. The outlet port 14b is an outlet for discharging the coolant which has passed through the pipe passage 14a. As shown in FIG. 2, the axial direction Fa is the direction that intersects the axial direction Ra.

As described later, the housing main body 11 of the present embodiment has an outer periphery support portion 11b that supports a part of a circular ring 45 of the stationary valve 40 through the gasket 50 from the other side in the axial direction Sa. The outer periphery support portion 11b projects from the inner wall 11a of the housing main body 11 toward an inner side in a radial direction of the axis S.

As shown in FIG. 3, the actuator 20 includes an actuator unit 21 and a housing 23. The actuator unit 21 includes an electric motor 21a and a gear mechanism 21b.

The electric motor 21a is controlled by an electronic control device 70 and outputs a rotational force to the gear mechanism 21b. For example, a direct current motor, a stepping motor or an alternating current motor is used as the electric motor 21a of the present embodiment.

The gear mechanism 21b includes a plurality of gears, which include a gear of a drive shaft 22. The gear mechanism 21b transmits the rotational force of the electric motor 21a to the drive valve 30 through the gears which are meshed one another. The drive shaft 22 is placed in the upstream passage 112 of the housing main body 11. The drive shaft 22 is arranged such that an axis of the drive shaft 22 coincides with the axis S. The drive shaft 22 is configured to rotate about the axis S.

In the present embodiment, the other axial side of the drive shaft 22 is coupled to the drive valve 30. Specifically, the other axial side of the drive valve 30 is press fitted to and is secured to the drive valve 30.

The drive valve 30 is shaped in a plate form such that a thickness direction of the drive valve 30 coincides with the axial direction Sa. Specifically, the drive valve 30 is a disc valve that is shaped in a circular plate form which is centered on the axis S. The drive valve 30 is placed such that the drive valve 30 covers the openings 41, 42, 43 of the stationary valve 40 from the one side in the axial direction Sa.

The other side of the drive valve 30 in the axial direction Sa has a sliding surface that is configured to slide relative to the stationary valve 40. Therefore, the drive valve 30 is configured to be rotated about the axis S while the drive valve 30 slides relative to the stationary valve 40.

Figure 9:
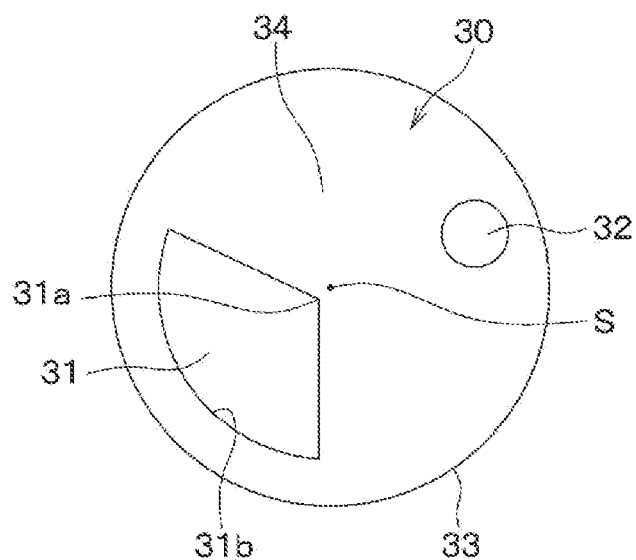
FIG. 9 is a front view of the drive valve shown in FIG. 3 viewed from the one side in the axial direction.
Figure 10:
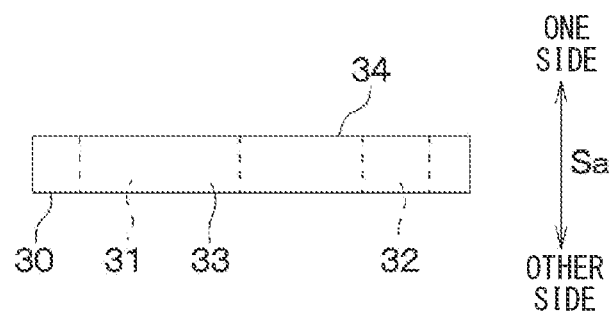
FIG. 10 is a side view of the drive valve shown in FIG. 9 viewed from the outer side in the radial direction of the axis.

As shown in FIGS. 9 and 10, the drive valve 30 forms a passage opening 31 and a communication opening 32.

The passage opening 31 is formed to extend through the drive valve 30 in the axial direction Sa (i.e., the thickness direction of the drive valve 30). In the drive valve 30, the passage opening 31 is opened in a form of a sector that has an apex 31a, which is placed on the inner side in the radial direction of the axis S; and a circumferential portion 31b, which is positioned on the outer side in the radial direction of the axis S. As described later, the passage opening 31 forms a second passage that conducts the coolant.

In the drive valve 30, the communication opening 32 is opened in a form of a circle. The communication opening 32 is located on an opposite side of the axis S which is opposite to the passage opening 31 in the radial direction of the axis S. The communication opening 32 is circumferentially displaced from the passage opening 31 in a circumferential direction of the axis S.

The communication opening 32 is formed to extend through the drive valve 30 in the axial direction Sa (i.e., the thickness direction of the drive valve 30). The communication opening 32 has a function of communicating between the opening 43 of the stationary valve 40 and the upstream passage 112.

An outer peripheral surface 33 is formed at an outer periphery of the drive valve 30 located on the outer side in the radial direction of the axis S such that the outer peripheral surface 33 extends continuously all around the axis S in the circumferential direction of the axis S. The outer peripheral surface 33 is an outer peripheral portion that faces the outer side in the radial direction of the axis S.

The outer peripheral surface 33 is formed to continuously cover the passage opening 31 and the communication opening 32 from the radially outer side thereof in the radial direction of the axis S. A covering portion 34, which covers the stationary valve 40 from the one side in the axial direction Sa, is formed at a remaining region of the drive valve 30 which is other than the passage opening 31 and the communication opening 32. The drive valve 30 of the present embodiment is formed by a sintered body (i.e., ceramic) made of a metal material, such as iron.

As shown in FIGS. 6 and 8, the stationary valve 40 is placed on the other side of the drive valve 30 in the axial direction Sa. The stationary valve 40 is placed on the one side of the bottom portion 110 of the housing main body 11 in the axial direction Sa.

Figure 11:
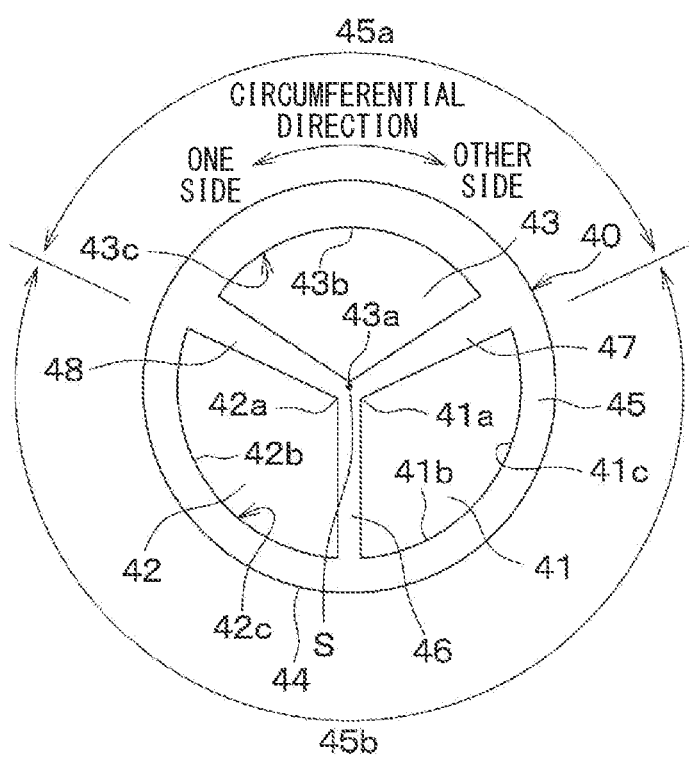
FIG. 11 is a front view of the stationary valve shown in FIG. 3 viewed from the one side in the axial direction.
Figure 12:
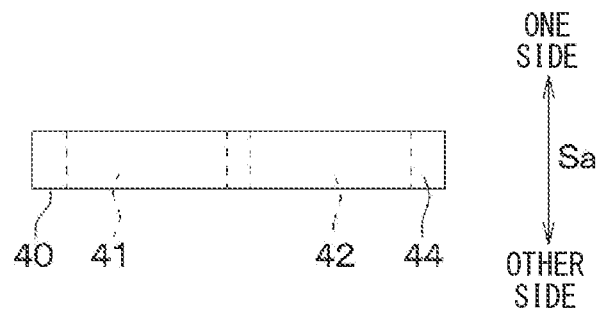
FIG. 12 is a side view of the stationary valve shown in FIG. 11 viewed from the outer side in the radial direction of the axis.

The stationary valve 40 is supported by the bottom portion 110 and the outer periphery support portion 11b of the housing 10 from the other side in the axial direction Sa. As shown in FIGS. 11 and 12, the stationary valve 40 is shaped in a plate form such that a thickness direction of the stationary valve 40 coincides with the axial direction Sa.

Specifically, the stationary valve 40 is a disc valve that is shaped in a circular plate form which is centered on the axis S. The one side of the stationary valve 40 in the axial direction Sa has a sliding surface that is configured to slide relative to the drive valve 30.

The stationary valve 40 forms the openings 41, 42, 43. The openings 41, 42, 43 are respectively formed to extend through the stationary valve 40 in the axial direction Sa (i.e., the thickness direction of the stationary valve 40). The openings 41, 42, 43 are arranged one after another in the circumferential direction of the axis S.

Specifically, the opening 41 is placed on the other side (also referred to as the other circumferential side) of the opening 43 in the circumferential direction of the axis S. The opening 42 is placed on the other side of the opening 41 in the circumferential direction of the axis S. The opening 43 is placed on the other side of the opening 42 in the circumferential direction of the axis S.

In the stationary valve 40, the opening 41 is opened in a form of a sector that has an apex 41a, which is placed on the inner side in the radial direction of the axis S; and a circumferential portion 41b, which is placed on the outer side in the radial direction of the axis S.

In the stationary valve 40, the opening 42 is opened in a form of a sector that has an apex 42a, which is placed on the inner side in the radial direction of the axis S; and a circumferential portion 42b, which is placed on the outer side in the radial direction of the axis S.

In the stationary valve 40, the opening 43 is opened in a form of a sector that has an apex 43a, which is placed on the inner side in the radial direction of the axis S; and a circumferential portion 43b, which is placed on the outer side in the radial direction of the axis S. In the present embodiment, the openings 41, 42, 43 are formed independently from each other.

The opening 41 is communicated with the outlet port 13b through the downstream passage 113 and the pipe passage 13a of the outlet pipe 13 and forms a first stationary-side passage that conducts the coolant. The opening 42 is communicated with the outlet port 14b through the downstream passage 114 and the pipe passage 14a of the outlet pipe 14 and forms a second stationary-side passage that conducts the coolant.

The opening 43 forms a penetrating chamber and is covered by the bottom portion 110 from the other side in the axial direction Sa. The opening 43 is covered by the covering portion 34 of the drive valve 30 from the one side in the axial direction Sa. The opening 43 is communicated with the upstream passage 112 of the coolant passage 111 through the communication opening 32.

An outer peripheral surface 44 is formed at an outer periphery of the stationary valve 40 located on the outer side in the radial direction of the axis S such that the outer peripheral surface 43 extends continuously all around the axis S in the circumferential direction of the axis S. The outer peripheral surface 44 is formed to continuously cover the openings 41, 42, 43 from the radially outer side thereof in the radial direction of the axis S.

As shown in FIGS. 11 and 12, the stationary valve 40 includes a circular ring 45 and beams 46, 47, 48. The circular ring 45 is shaped in a circular ring form that is centered on the axis S and surrounds the openings 41, 42, 43 from the outer side in the radial direction of the axis S.

The beams 46, 47, 48 are respectively formed to extend in the radial direction of the axis S. The beams 46, 47, 48 are displaced from each other in the circumferential direction of the axis S.

The beam 46 is placed between the openings 41, 42. The beam 47 is placed between the openings 41, 43. The beam 48 is placed between the openings 43, 42.

A radially outer side of the beam 46 is joined to the circular ring 45 in the radial direction of the axis S. A radially outer side of the beam 47 is joined to the circular ring 45 in the radial direction of the axis S. A radially outer side of the beam 48 is joined to the circular ring 45 in the radial direction of the axis S. Radially inner sides of the beams 46, 47, 48 are joined together in the radial direction of the axis S.

In the present embodiment, as shown in FIG. 11, in the stationary valve 40, a sector-shaped region 45a, which is placed on the one side of the opening 41 in the circumferential direction and is placed on the other side of the opening 42 in the circumferential direction, and the beam 46 are supported by the bottom portion 110 from the other side in the axial direction.

The sector-shaped region 45a includes the beams 47, 48 and a region of the circular ring 45, which is placed on the one side (also referred to as one circumferential side) of the opening 41 in the circumferential direction and is placed on the other side of the opening 42 in the circumferential direction.

A sector-shaped region 45b of the circular ring 45, which is placed on the other side of the beam 47 in the circumferential direction and is placed on the one side of the beam 48 in the circumferential direction, is supported by the outer periphery support portion 11b.

The bottom portion 110 is placed on the other side of the upstream passage 112 of the housing main body 11 in the axial direction Sa. The bottom portion 110 is arranged to cover the upstream passage 112 from the other side in the axial direction Sa. As shown in FIGS. 3 and 4, the outer periphery support portion 11b projects from the inner wall 11a of the housing main body 11 toward the inner side in the radial direction of the axis S.

As shown in FIGS. 6 and 8, the gasket 50 is placed on the other side of the stationary valve 40 in the axial direction Sa. The gasket 50 is placed on the one side of the bottom portion 110 and the outer periphery support portion 11b of the housing main body 11 in the axial direction Sa.

Figure 13:
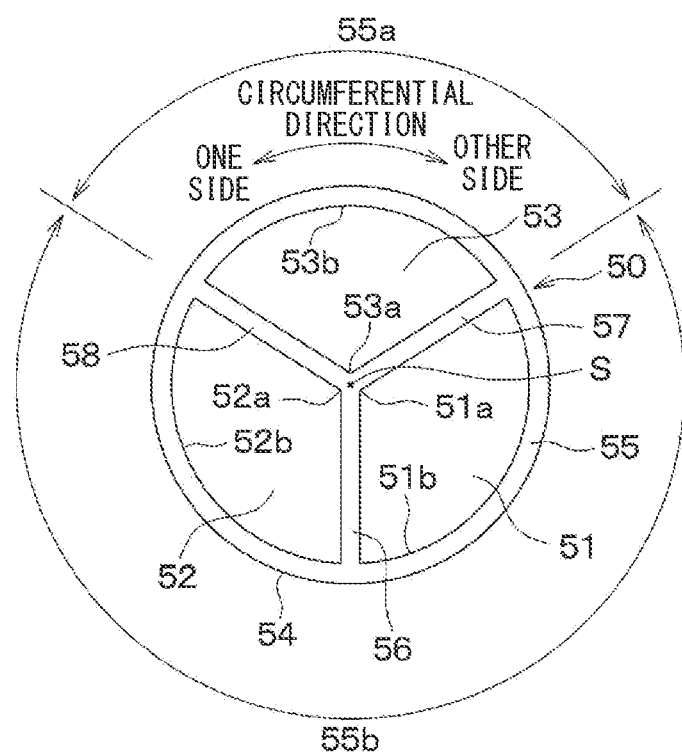
FIG. 13 is a front view of a gasket shown in FIG. 3 viewed from the one side in the axial direction.
Figure 14:
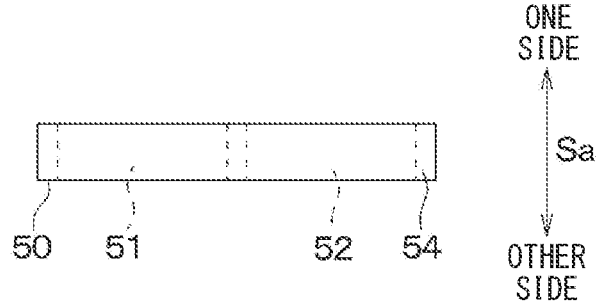
FIG. 14 is a side view of the gasket shown in FIG. 13 viewed from the outer side in the radial direction of the axis.

The gasket 50 is supported by the bottom portion 110 and the outer periphery support portion 11b of the housing 10 from the other side in the axial direction Sa. As shown in FIGS. 13 and 14, the gasket 50 is shaped in a plate form such that an axis of the gasket 50 coincides with the axis S. Specifically, the gasket 50 is shaped in a circular plate form which is centered on the axis S.

The gasket 50 forms openings 51, 52, 53. The openings 51, 52, 53 are respectively formed to extend through the gasket 50 in the axial direction Sa. The openings 51, 52, 53 are arranged one after another in the circumferential direction of the axis S.

Specifically, the opening 51 is placed on the other side of the opening 53 in the circumferential direction of the axis S. The opening 52 is placed on the other side of the opening 51 in the circumferential direction of the axis S. The opening 53 is placed on the other side of the opening 52 in the circumferential direction of the axis S.

The opening 51 is placed to overlap with the opening 41 of the stationary valve 40 in the axial direction Sa. The opening 51 is communicated with the opening 41 of the stationary valve 40. The opening 51 is communicated with the outlet port 13b through the pipe passage 13a of the outlet pipe 13.

In the gasket 50, the opening 51 is opened in a form of a sector that has an apex 51a, which is placed on the inner side in the radial direction of the axis S; and a circumferential portion 51b, which is placed on the outer side in the radial direction of the axis S.

The opening 52 is placed to overlap with the opening 42 of the stationary valve 40 in the axial direction Sa. The opening 52 is communicated with the opening 42 of the stationary valve 40. The opening 52 is communicated with the outlet port 14b through the downstream passage 114 and the pipe passage 14a of the outlet pipe 14.

In the gasket 50, the opening 52 is opened in a form of a sector that has an apex 52a, which is placed on the inner side in the radial direction of the axis S; and a circumferential portion 52b, which is placed on the outer side in the radial direction of the axis S.

The opening 53 is placed to overlap with the opening 43 of the stationary valve 40 in the axial direction Sa. The opening 53 is communicated with the opening 43 of the stationary valve 40. The opening 53 is covered by the bottom portion 110 from the other side in the axial direction Sa.

In the gasket 50, the opening 53 is opened in a form of a sector that has an apex 53a, which is placed on the inner side in the radial direction of the axis S; and a circumferential portion 53b, which is placed on the outer side in the radial direction of the axis S.

An outer peripheral surface 54 is formed at an outer periphery of the gasket 50 placed on the outer side in the radial direction of the axis S such that the outer peripheral surface 54 extends continuously all around the axis S in the circumferential direction of the axis S. The outer peripheral surface 54 is formed to continuously cover the openings 51, 52, 53 from the outer side in the radial direction of the axis S.

As shown in FIGS. 13 and 14, the gasket 50 includes a circular ring 55 and beams 56, 57, 58. The circular ring 55 is shaped in a circular ring form that is centered on the axis S and surrounds the openings 51, 52, 53 from the outer side in the radial direction of the axis S.

The beams 56, 57, 58 are arranged one after another in the circumferential direction of the axis S. The beams 56, 57, 58 are respectively formed to extend in the radial direction of the axis S. The beam 56 is placed between the openings 51, 52. The beam 57 is placed between the openings 51, 53. The beam 58 is placed between the openings 53, 52.

A radially outer side of the beam 56 is joined to the circular ring 55 in the radial direction of the axis S. A radially outer side of the beam 57 is joined to the circular ring 55 in the radial direction of the axis S. A radially outer side of the beam 58 is joined to the circular ring 55 in the radial direction of the axis S. Radially inner sides of the beams 56, 57, 58 are joined together in the radial direction of the axis S.

In the gasket 50, a sector-shaped region 55a, which is placed on the one side of the opening 51 in the circumferential direction and is placed on the other side of the opening 52 in the circumferential direction, and the beam 56 are supported by the bottom portion 110 from the other side in the axial direction.

The sector-shaped region 55a includes the beams 57, 58 and a region of the circular ring 55, which is placed on the one side of the opening 51 in the circumferential direction and is placed on the other side of the opening 52 in the circumferential direction.

The sector-shaped region 55a is placed to overlap with the sector-shaped region 45a of the stationary valve 40 in the axial direction Sa. The beam 56 is placed to overlap with the beam 46 of the stationary valve 40 in the axial direction Sa.

A sector-shaped region 55b of the circular ring 55, which is placed on the other side of the beam 57 in the circumferential direction of the axis S and is placed on the one side of the beam 58 in the circumferential direction of the axis S, is supported by the outer periphery support portion 11b. The sector-shaped region 55b is placed to overlap with the sector-shaped region 45b of the stationary valve 40 in the axial direction Sa.

In the present embodiment, the gasket 50 is pushed by a resilient force of the spring 60, so that the gasket 50 is compressed through the resilient deformation thereof between: the outer periphery support portion 11b and the bottom portion 110 of the housing 10; and the stationary valve 40.

In this way, the gasket 50 serves as a seal member and seals between: the bottom portion 110 and the outer periphery support portion 11b; and the stationary valve 40.

Specifically, the gasket 50 seals between: an opening forming portion 41c of the stationary valve 40, which forms the opening 41; and the bottom portion 110 and the outer periphery support portion 11b of the housing 10. Also, the gasket 50 seals between: an opening forming portion 42c of the stationary valve 40, which forms the opening 42; and the bottom portion 110 and the outer periphery support portion 11b of the housing 10.

Furthermore, the gasket 50 seals between: the bottom portion 110 and the outer periphery support portion 11b of the housing 10; and an opening forming portion 43c of the stationary valve 40, which forms the opening 43 of the stationary valve 40. The gasket 50 is made of an elastic material, such as rubber or resin, which is resiliently or elastically deformable.

Figure 15:
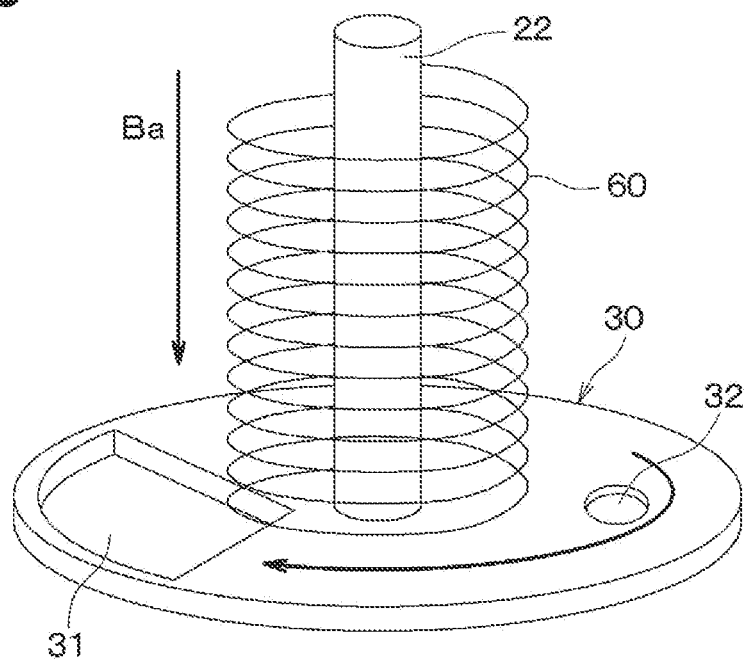
FIG. 15 is a perspective view indicating a positional relationship between the drive valve and the spring shown in FIG. 3 to assist in explaining a resilient force applied from the spring to the drive valve.
Figure 16:
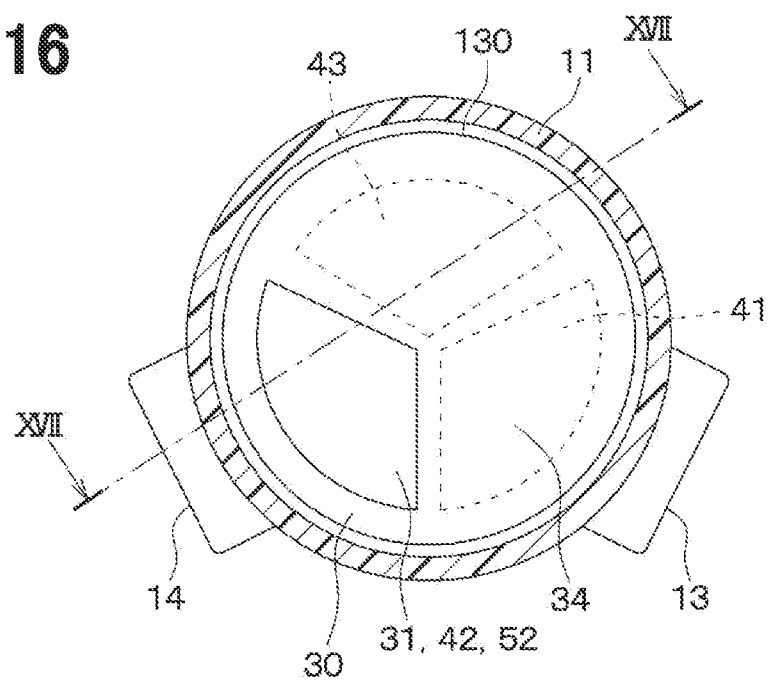
FIG. 16 is a view of a drive valve and a stationary valve at an inside of a housing of a valve device of a comparative example viewed from the one side in the axial direction while a drive shaft and a spring are omitted.
Figure 17:
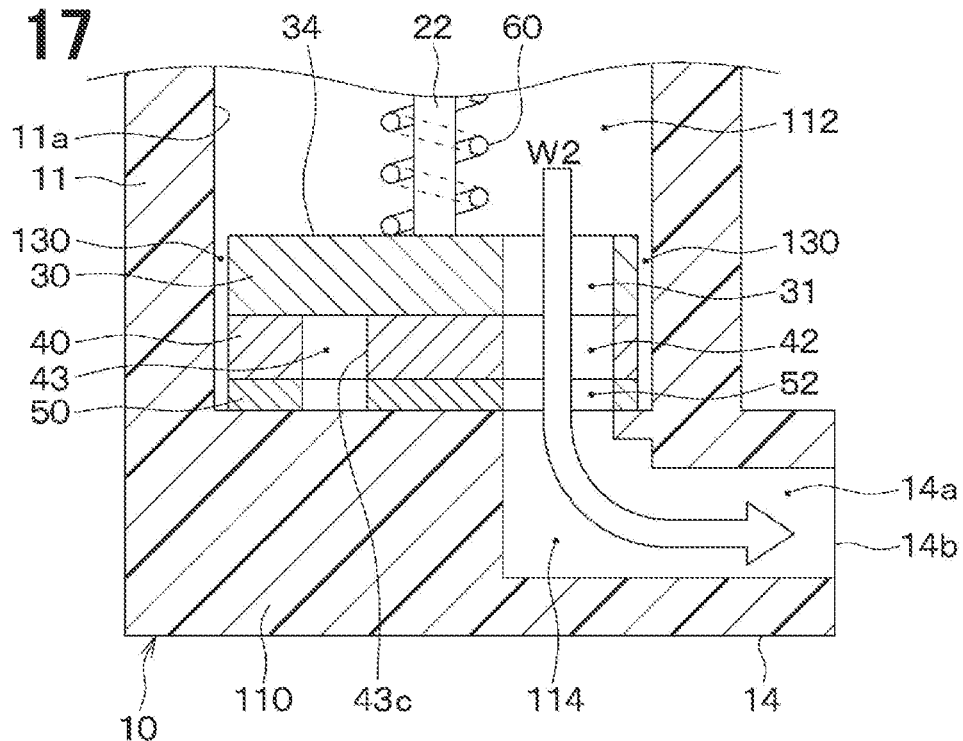
FIG. 17 is a cross-sectional view taken along line XVII-XVII in FIG. 16 of the comparative example.
Figure 18:
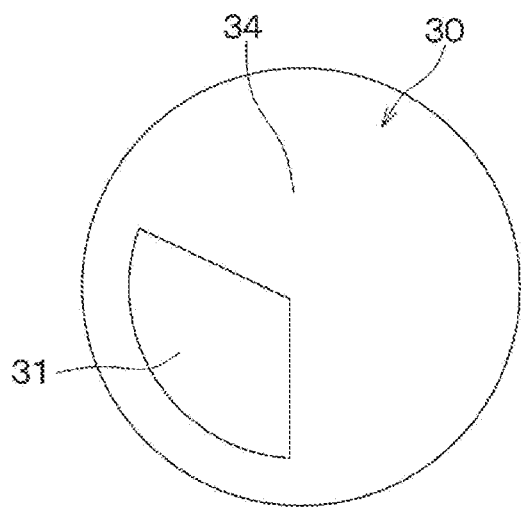
FIG. 18 is a front view of the drive valve shown in FIG. 17 of the comparative example viewed from the one side in the axial direction.
Figure 19:
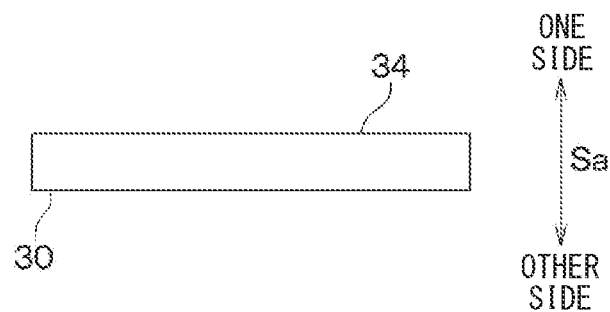
FIG. 19 is a side view of the drive valve shown in FIG. 17 of the comparative example viewed from the outer side in the radial direction of the axis.

As shown in FIGS. 3 and 4, the spring 60 is placed in the upstream passage 112 and is supported by the housing 23 of the actuator unit 21. The spring 60 serves as a pushing member and generates a resilient force which urges the drive valve 30 toward the other side in the axial direction Sa, as indicated by an arrow Ba in FIG. 15. The spring 60 is formed by, for example, a compression spring, i.e., a compression coil spring.

Next, an operation of the valve device of the present embodiment will be described with reference to FIGS. 5 to 8. Each of FIGS. 5 and 7 is a view of the drive valve 30 in the housing 10 of the valve device of the present embodiment viewed from the one side in the axial direction Sa. In FIGS. 5 and 7, indication of the drive shaft 22 and the spring 60 are omitted.

First of all, as shown in FIG. 7, the drive valve 30 is placed in a state where the covering portion 34 of the drive valve 30 covers the opening 42 of the stationary valve 40, and the passage opening 31 of the drive valve 30 is communicated with the opening 41 of the stationary valve 40.

At this time, the coolant flows into the pipe passage 12a through the inlet port 12b of the inlet pipe 12. In response to this, the coolant, which has passed through the pipe passage 12a, flows into the upstream passage 112.

At this time, the coolant, which flows in the upstream passage 112, flows into the downstream passage 113 after passing through the passage opening 31 of the drive valve 30, the opening 41 of the stationary valve 40 and the opening 51 of the gasket 50, as indicated by an arrow W1 in FIG. 8.

Then, the coolant in the downstream passage 113 is discharged from the outlet port 13b through the pipe passage 13a of the outlet pipe 13.

As described above, in the state where the passage opening 31 of the drive valve 30 is communicated with the opening 41 of the stationary valve 40, the opening 43 is not sealed and is communicated with the upstream passage 112 through the communication opening 32.

Therefore, the opening 43 is placed in the state where the coolant flows into the inside of the opening 43 from the upstream passage 112 through the communication opening 32.

Next, the electric motor 21a is controlled by the electronic control device 70 and outputs the rotational force to the drive valve 30 through the gear mechanism 21b. Then, the drive valve 30 is rotated about the axis S by the gear mechanism 21b toward the other side in the circumferential direction.

Thus, as shown in FIG. 5, the drive valve 30 is placed in a state where the covering portion 34 of the drive valve 30 covers the opening 41 of the stationary valve 40, and the passage opening 31 of the drive valve 30 is communicated with the opening 42 of the stationary valve 40.

At this time, the coolant, which flows in the upstream passage 112 after passing through the inlet port 12b and the pipe passage 12a of the inlet pipe 12, flows into the downstream passage 114 after passing through the passage opening 31 of the drive valve 30, the opening 42 and the opening 52, as indicated by an arrow W2 in FIG. 6.

In response to this, the coolant in the downstream passage 114 is discharged from the outlet port 14b through the pipe passage 14a of the outlet pipe 14.

As described above, in the state where the passage opening 31 of the drive valve 30 is communicated with the opening 42 of the stationary valve 40, the opening 43 is not sealed and is communicated with the upstream passage 112 through the communication opening 32. Therefore, the opening 43 is placed in the state where the coolant flows into the inside of the opening 43 from the upstream passage 112 through the communication opening 32.

Next, the actuator unit 21 rotates the drive valve 30 about the axis S through the drive shaft 22, so that the drive valve 30 is placed in a state where the passage opening 31 of the drive valve 30 is communicated with each of the openings 41, 42 of the stationary valve 40.

At this time, the coolant, which flows in the upstream passage 112, flows into the downstream passage 113 after passing through the passage opening 31 of the drive valve 30, the opening 41 of the stationary valve 40 and the opening 51 of the gasket 50. Then, the coolant in the downstream passage 113 is discharged from the outlet port 13b through the pipe passage 13a of the outlet pipe 13.

In addition, the coolant, which flows in the upstream passage 112, flows into the downstream passage 114 after passing through the passage opening 31 of the drive valve 30, the opening 42 of the stationary valve 40 and the opening 52 of the gasket 50. Then, the coolant in the downstream passage 114 is discharged from the outlet port 14b through the pipe passage 14a of the outlet pipe 14.

As discussed above, the coolant, which flows in the upstream passage 112, is discharged from the outlet port 13b of the outlet pipe 13 and the outlet port 14b of the outlet pipe 14.

Here, the actuator unit 21 rotates the drive valve 30 about the axis S through the drive shaft 22 toward the other side in the circumferential direction. In response to this, an opening cross-sectional area between the passage opening 31 and the opening 41 is decreased, and an opening cross-sectional area between the passage opening 31 and the opening 42 is increased.

Then, a flow rate of the coolant, which flows from the upstream passage 112 and is discharged from the outlet port 13b through the passage opening 31, the opening 41, the downstream passage 113 and the pipe passage 13a of the outlet pipe 13, is decreased.

In contrast, a flow rate of the coolant, which flows from the upstream passage 112 and is discharged from the outlet port 14b through the passage opening 31, the opening 42, the downstream passage 114 and the pipe passage 14a of the outlet pipe 14, is increased.

Furthermore, the actuator unit 21 rotates the drive valve 30 about the axis S through the drive shaft 22 toward the one side in the circumferential direction. In response to this, the opening cross-sectional area between the passage opening 31 and the opening 41 is increased, and the opening cross-sectional area between the passage opening 31 and the opening 42 is decreased.

Then, the flow rate of the coolant, which flows from the upstream passage 112 and is discharged from the outlet port 13b through the passage opening 31, the opening 41, the downstream passage 113 and the pipe passage 13a of the outlet pipe 13, is increased.

In contrast, the flow rate of the coolant, which flows from the upstream passage 112 and is discharged from the outlet port 14b through the passage opening 31, the opening 42, the downstream passage 114 and the pipe passage 14a of the outlet pipe 14, is decreased.

As described above, in the state where the passage opening 31 of the drive valve 30 is communicated with the openings 41, 42 of the stationary valve 40, the opening 43 is not sealed and is communicated with the upstream passage 112 through the communication opening 32. Therefore, the opening 43 is placed in the state where the coolant flows into the inside of the opening 43 from the upstream passage 112 through the communication opening 32.

In the present embodiment described above, the valve device includes the housing 10, the drive valve 30, the stationary valve 40 and the gasket 50. The housing 10 forms: the inlet port 12b for receiving the coolant; the coolant passage 111 for conducting the coolant supplied from the inlet port 12b; and the outlet ports 13b, 14b for discharging the coolant passed through the coolant passage 111.

The stationary valve 40 forms the openings 41, 42, 43 which are arranged one after another in the circumferential direction of the axis S. The opening 41 forms the first passage which conducts the coolant, and the opening 41 is the opening which is communicated with the outlet port 13b. The opening 42 is the opening which is communicated with the outlet port 14b. The opening 43 is the penetrating chamber that penetrates through the stationary valve 40 in the axial direction Sa.

The drive valve 30 is formed such that the drive valve 30 covers the openings 41, 42, 43 of the stationary valve 40 from the one side in the axial direction Sa in the coolant passage 111. The drive valve 30 is configured to be freely rotatable about the axis S.

The drive valve 30 forms: the passage opening (serving as the second passage) 31 and the communication opening 32 which extend through the drive valve 30 in the axial direction Sa; and the covering portion 34 which covers the openings 41, 42 from the one side in the axial direction Sa. The drive valve 30 is configured such that the passage opening 31 is communicated with at least one of the openings 41, 42 through the rotation of the drive valve 30.

The housing 10 includes the bottom portion 110, and the bottom portion 110 is formed to cover the opening 43 of the stationary valve 40 from the other side in the axial direction Sa and supports the stationary valve 40 from the other side in the axial direction Sa.

For example, when the passage opening 31 of the drive valve 30 is communicated with the opening 41 of the stationary valve 40, the inlet port 12b and the outlet port 13b are communicated with each other through the passage opening 31 and the opening 41.

Furthermore, when the passage opening 31 of the drive valve 30 is communicated with the opening 42 of the stationary valve 40, the inlet port 12b and the outlet port 14b are communicated with each other through the passage opening 31 and the opening 42.

The drive valve 30 forms the communication opening 32 which communicates between the opening 43 of the stationary valve 40 and the upstream passage 112. The communication opening 32 is formed to extend through the drive valve 30 from the opening 41 in the axial direction Sa. The upstream passage 112 is located on the upstream side of the drive valve 30 and the stationary valve 40 in the flow direction of the coolant in the coolant passage 111.

Here, as shown in FIGS. 16 to 19, in a case where the communication opening 32 is not formed in the drive valve 30, the following disadvantage may occur. Specifically, the opening 43 becomes a sealed region that is sealed by the covering portion 34 of the stationary valve 40, the bottom portion 110 of the housing main body 11 and the opening forming portion 43c while the opening forming portion 43c forms the opening 43 of the stationary valve 40.

In a case where the air is sealed in the sealed region, at a high temperature, the air in the sealed region expands to displace the drive valve 30 toward the one side in the axial direction. Therefore, a gap is formed between the drive valve 30 and the stationary valve 40. In contrast, at a low temperature, the air in the sealed region shrinks to pull the drive valve 30 toward the other side in the axial direction. Thus, a frictional force between the stationary valve 40 and the drive valve 30 is increased.

In contrast, in the present embodiment, as described above, the drive valve 30 forms the communication opening 32 which communicates between the opening 43 of the stationary valve 40 and the upstream passage 112.

Thereby, it is possible to provide the valve device, in which the sealed region between the bottom portion 110 of the housing 10 and the drive valve 30 is eliminated. As a result, the drive valve 30 will not be displaced toward the one side in the axial direction at the high temperature and will not be pulled toward the other side in the axial direction at the low temperature.

According to the present embodiment described above, the following advantages can be obtained.

(1) The drive valve 30 includes the outer peripheral surface 33, which covers the passage opening 31 and the communication opening 32 from the outer side in the radial direction of the axis S. The outer peripheral surface 33 extends continuously all around the axis S in the circumferential direction of the axis S.

Here, the drive valve 30 is the ceramic disc valve that is manufactured by a calcining process for calcining a slurry. The slurry is a fluid which contains a resin or metal material and is used as a raw material for the ceramic.

For this reason, the drive valve 30 of the present embodiment is less likely to cause generation of a strain during the calcining process in comparison to a drive valve in which the passage opening 31 is formed as a cutout hole that opens toward the outer side in the radial direction of the axis S.

Thus, the drive valve 30 of the present embodiment will be less likely to have a variation in the position of the passage opening 31 at the calcining process of the slurry. Therefore, the flow rate control of the fluid, which flows in the corresponding opening 41, 42, can be performed with high precision.

(2) The stationary valve 40 includes the outer peripheral surface 44, which covers the openings 41, 42, 43 from the outer side in the radial direction of the axis S. The outer peripheral surface 44 extends continuously all around the axis S in the circumferential direction of the axis S.

Here, the stationary valve 40 is a ceramic disc valve that is manufactured by a calcining process for calcining a slurry.

For this reason, the stationary valve 40 of the present embodiment is less likely to cause generation of the strain in the stationary valve 40 during the calcining process in comparison to a stationary valve in which the respective passage openings 41-43 are formed as a cutout hole that opens toward the outer side in the radial direction of the axis S.

Thus, the stationary valve 40 of the present embodiment will be less likely to have a variation in the position of the respective passage openings 41, 42, 43 at the calcining process of the slurry. Therefore, the flow rate control of the fluid, which flows in the corresponding opening 41, 42, can be performed with high precision.

(3) The spring 60 is placed in the upstream passage 112 and is supported by the housing 23 of the actuator unit 21 such that the spring 60 generates the resilient force which urges the drive valve 30 toward the other side in the axial direction Sa.

Thereby, the force can be applied by the resilient force of the spring 60 against the gasket 50 from the drive valve 30 through the stationary valve 40. Thus, the gasket 50 is compressed through the resilient deformation thereof between: the bottom portion 110 and the outer periphery support portion 11b of the housing main body 11; and the stationary valve 40.

As a result, the gasket 50 can improve the degree of sealing for sealing between: the bottom portion 110 and the outer periphery support portion 11b of the housing main body 11; and the stationary valve 40. In addition, the sliding surface of the drive valve 30 and the sliding surface of the stationary valve 40 can be brought into proper contact by the resilient force of the spring 60.

(4) The spring 60 is the compression spring which is placed on the one side of the drive valve 30 in the axial direction Sa and generates the resilient force that urges the drive valve 30 against the stationary valve 40.

Figure 20:
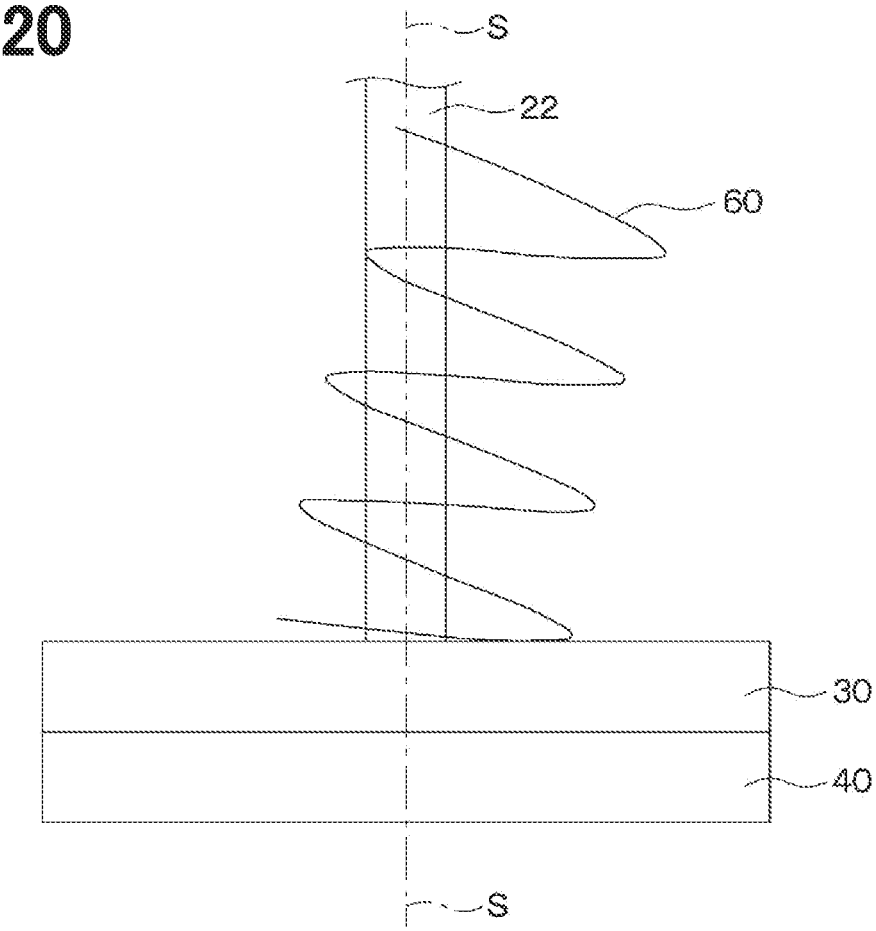
FIG. 20 is a view for explaining a resilient force applied from the spring to the drive valve shown in FIG. 3, indicating a state where an axis of the spring is tilted relative to the axis of the drive shaft.

Therefore, as shown in FIG. 20, even in a case where the spring 60 is tilted relative to the axis S, the sufficient resilient force can be applied from the spring 60 to the drive valve 30.

(5) The gasket 50 seals between the stationary valve 40 and the bottom portion 110 of the housing main body 11. Specifically, the gasket 50 seals between: the opening forming portion 41c of the stationary valve 40, which forms the opening 41; and the bottom portion 110 of the housing main body 11.

Furthermore, the gasket 50 seals between: the opening forming portion 42c of the stationary valve 40, which forms the opening 42; and the bottom portion 110 of the housing main body 11. Also, the gasket 50 seals between: the opening forming portion 43c of the stationary valve 40, which forms the opening 43; and the bottom portion 110 of the housing main body 11.

Thus, leakage of the coolant from a gap between the stationary valve 40 and the bottom portion 110 of the housing main body 11 can be limited.

(6) As the stationary valve 40, there is used the disc valve, which is shaped in the plate form such that the thickness direction of the disc valve coincides with the axial direction Sa. Therefore, the dimension of the valve device in the axial direction Sa can be reduced.

(7) As the drive valve 30, there is used the disc valve, which is shaped in the plate form such that the thickness direction of the disc valve coincides with the axial direction Sa. Therefore, the dimension of the valve device in the axial direction Sa can be reduced.

Second Embodiment

In the first embodiment, there is described the example, in which the spring 60 is provided to apply the force from the drive valve 30 to the stationary valve 40. Alternatively, in a second embodiment, the spring 60 may be eliminated.

Figure 21:
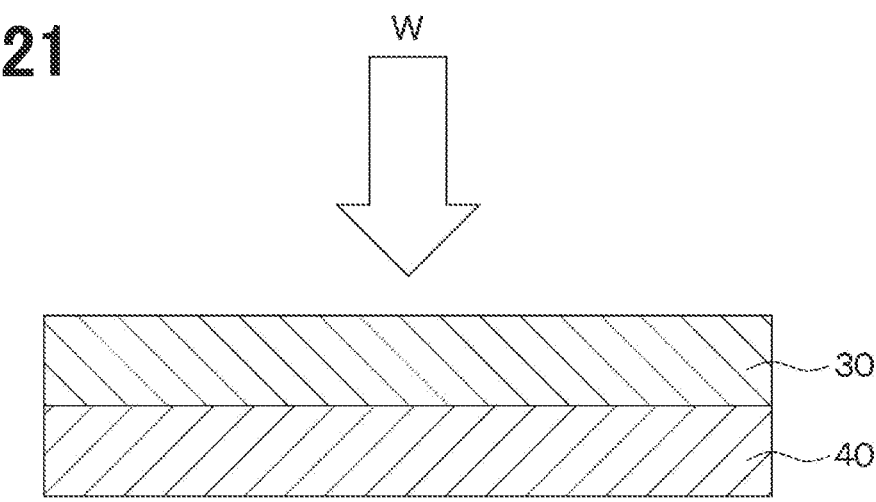
FIG. 21 is a diagram for assisting an explanation of a hydraulic pressure applied to a drive valve received in a housing of a valve device of a second embodiment.

In such a case, as indicated by an arrow W in FIG. 21, the hydraulic pressure of the coolant in the upstream passage 112 is applied to the drive valve 30 toward the other side in the axial direction Sa. Therefore, the gasket 50 is compressed through the resilient deformation thereof between: the outer periphery support portion 11b and the bottom portion 110 of the housing 10; and the stationary valve 40 by the hydraulic pressure applied from the drive valve 30 to the gasket 50 through the stationary valve 40. Thus, the gasket 50 seals between: the bottom portion 110 and the outer periphery support portion 11b; and the stationary valve 40.

Third Embodiment

In the first embodiment, there is described the example, in which the spirally wound spring 60 is provided. Alternatively, in a third embodiment, as shown in FIG. 22, a spring 60A made of rubber may be provided.

The spring 60A of the present embodiment includes: a spring main body 61, which extends through the drive valve 30, the stationary valve 40 and the gasket 50; and a head 62, which is located on the one side of the spring main body 61 in the axial direction Sa. The spring main body 61 is shaped in an elongated form that extends from the head 62 toward the other side in the axial direction Sa.

A diameter of the head 62 is larger than an inner diameter of a through-hole of the drive valve 30, through which the spring main body 61 is inserted. The other side of the spring main body 61, which is located on the other side in the axial direction Sa, is fixed to the bottom portion 110 of the housing main body 11.

Figure 22:
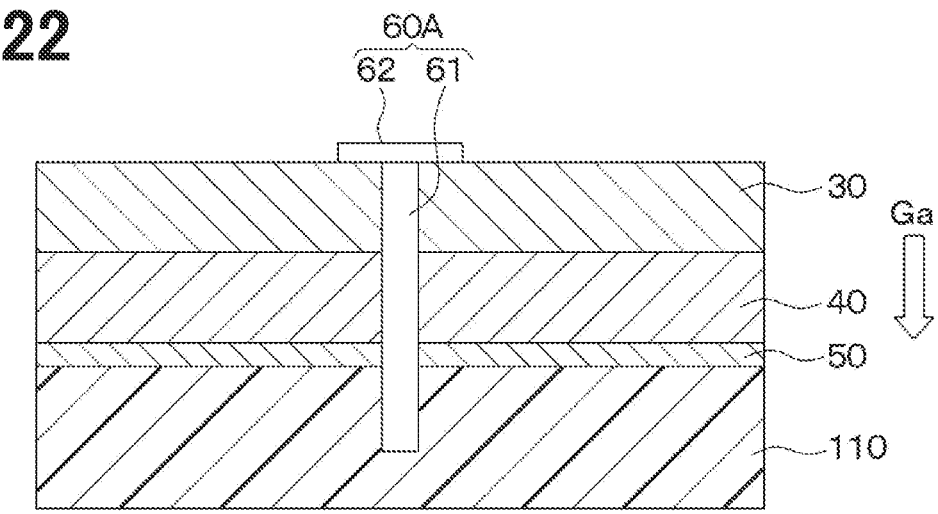
FIG. 22 is a diagram for assisting an explanation of a rubber spring which applies a resilient force toward the other side in the axial direction against a drive valve received in a housing of a valve device of a third embodiment.

In the present embodiment, the head 62 of the spring 60A exerts a resilient force which urges the drive valve 30 toward the other side in the axial direction Sa, as indicated by an arrow Ga in FIG. 22. Therefore, the resilient force is applied from the drive valve 30 to the gasket 50 through the stationary valve 40.

Thus, like in the first embodiment, the gasket 50 is compressed through the resilient deformation thereof between: the bottom portion 110 and the outer periphery support portion 11b of the housing main body 11; and the stationary valve 40. As a result, the gasket 50 can seal between: the bottom portion 110 and the outer periphery support portion 11b of the housing main body 11; and the stationary valve 40.

Fourth Embodiment

In a fourth embodiment, with reference to FIGS. 23 and 24, there will be described a valve device that is formed by adding a coil spring 80 to the valve device of the first embodiment.

Figure 23:
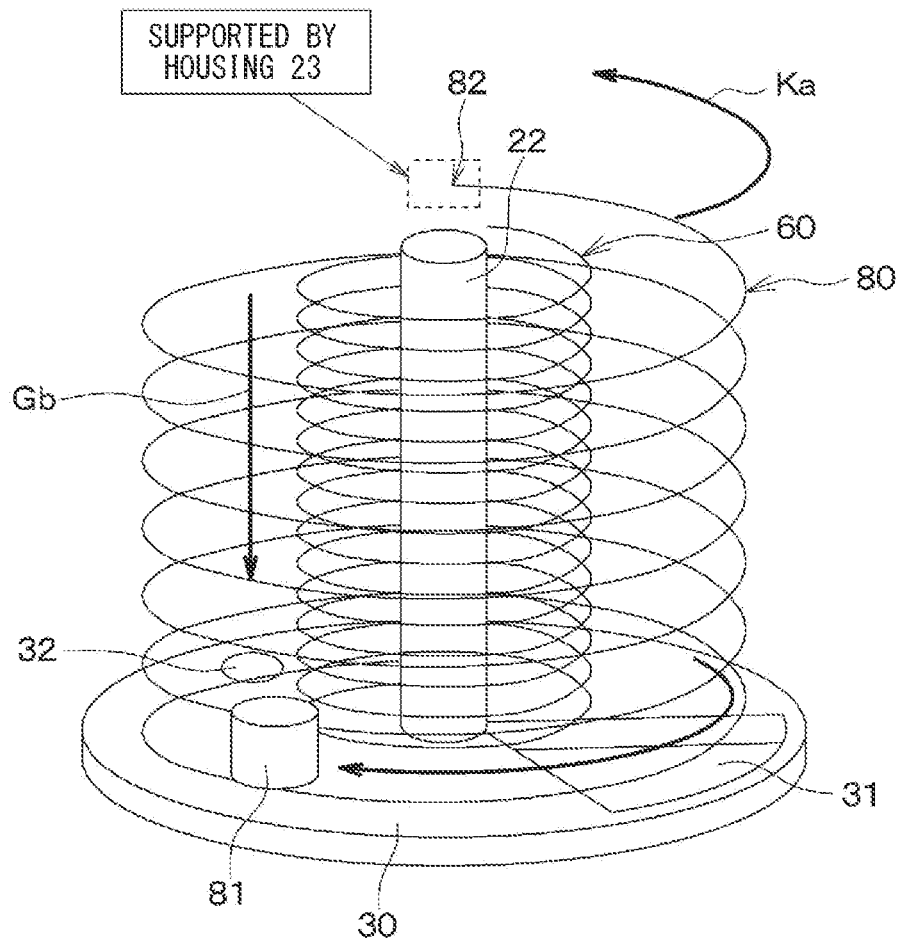
FIG. 23 is a diagram for assisting an explanation of a coil spring which urges a drive valve toward one side in a circumferential direction in a housing of a valve device of a fourth embodiment.

FIG. 23 shows the spring 60, the coil spring 80 and the drive shaft 22 which are placed on the one side of the drive valve 30 in the axial direction Sa in the housing 10 of the valve device of the present embodiment.

The coil spring 80 of the present embodiment is wound in a form of a coil which is centered on the drive shaft 22 (i.e., the axis S). The coil spring 80 is placed on the outer side of the spring 60 in the radial direction of the axis S.

One end portion 82 of the coil spring 80, which faces the one side in the axial direction Sa, is fixed by the housing 23 of the actuator 20. The other end portion of the coil spring 80, which faces the other side in the axial direction Sa, is fixed to the drive valve 30 through a fixing portion 81.

The coil spring 80 is used in a state where the coil spring 80 is twisted in the circumferential direction of the axis S and thereby has undergone a resilient deformation (i.e., torsional resilient deformation). The coil spring 80 generates an urging force Ka which urges the drive valve 30 toward the one side in the circumferential direction due to the torsional elastic deformation of the coil spring 80.

In short, the coil spring 80 is a resilient member which generates the urging force Ka through the torsional resilient deformation of the coil spring 80. In this way, the coil spring 80 functions as a torsion spring.

The urging force Ka of the coil spring 80 is transmitted as a rotational force to the drive valve 30, the drive shaft 22, the gear mechanism 21b and the electric motor 21a in this order. Therefore, during the operation of the valve device, even when the electric motor 21a is not rotating, a reaction force, which is exerted against the urging force Fc of the coil spring 80, is generated.

Therefore, during the operation of the valve device, even when the electric motor 21a is not rotating, a reaction force, which is exerted against the urging force Ka of the coil spring 80, is generated.

The coil spring 80 serves as an urging member and urges the drive valve 30 toward the one side in the circumferential direction. Thus, at each of the meshing points of the gears of the gear mechanism 21b, the coil spring 80 urges one of a pair of teeth, which are meshed with each other at a corresponding one of the meshing points, against the other one of the pair of teeth.

Figure 24:
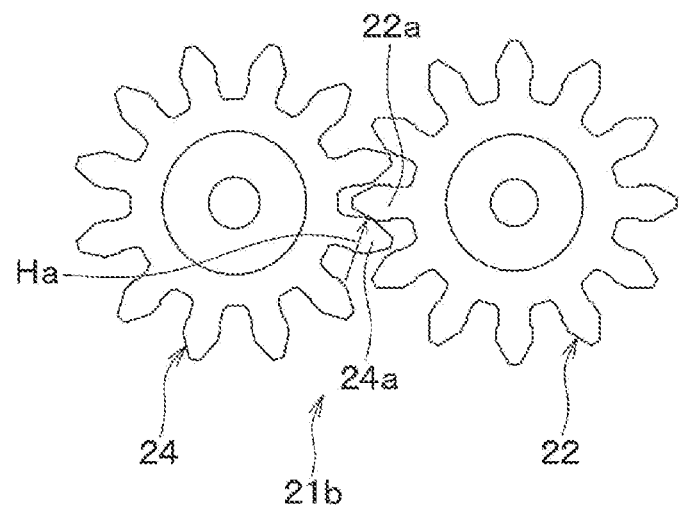
FIG. 24 is a diagram for assisting an explanation of an operation of the coil spring of the valve device of the fourth embodiment, indicating two gears of a gear mechanism.

For example, at the time of rotating the drive valve 30 toward the other side in the circumferential direction of the axis S by applying the rotational force of the electric motor 21a to the drive valve 30 through the gear mechanism 21b, a tooth 24a of a gear 24 urges the tooth 22a of the drive shaft 22 in the gear mechanism 21b, as indicated by an arrow Ha in FIG. 24.

Here, the gear 24 of the gear mechanism 21b is a gear that transmits the rotational force of the electric motor 21a to the drive shaft 22.

Therefore, it is possible to limit the variation in the opening degree of the respective openings 41, 42 of the stationary valve 40 caused by a backlash of the gear 24 and the drive shaft 22 in comparison to the case where, for example, the urging by the coil spring 80 is absent. Therefore, the flow rate control of the coolant can be performed with high precision at the valve device.

Fifth Embodiment

In the first embodiment, there is described the example, in which the gasket 50 is provided between the stationary valve 40 and the bottom portion 110 of the housing main body 11. Alternative to this, as in a fifth embodiment, the gasket 50 between the stationary valve 40 and the bottom portion 110 of the housing main body 11 may be eliminated.

Figure 25:
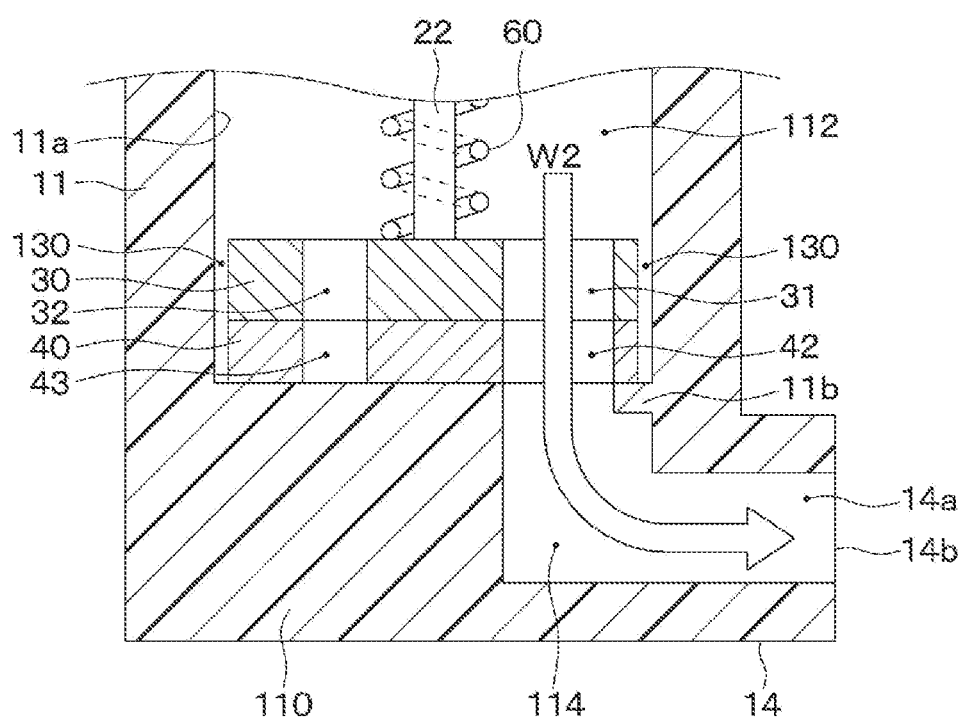
FIG. 25 is a cross-sectional view showing a configuration of an inside of a housing of a valve device of a fifth embodiment, corresponding to FIG. 6 of the first embodiment.
Figure 26:
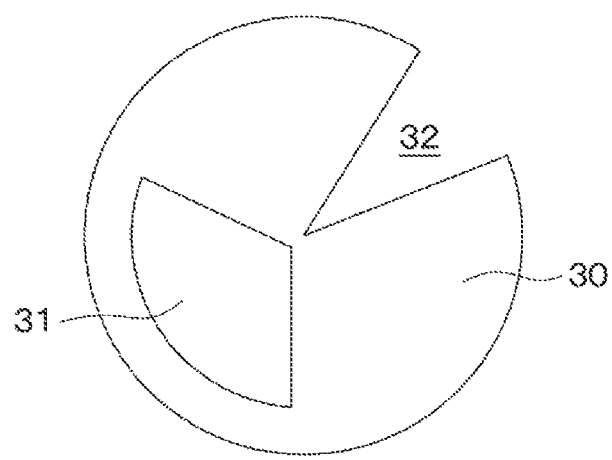
FIG. 26 is a front view of a drive valve of a sixth embodiment viewed from the one side in the axial direction.
Figure 27:
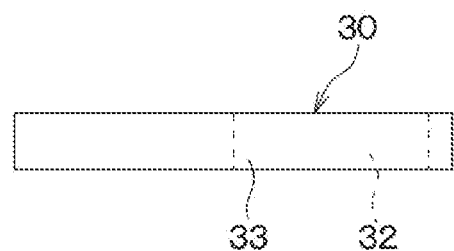
FIG. 27 is a side view of the drive valve shown in FIG. 26 viewed from the outer side in the radial direction of the axis.
Figure 28:
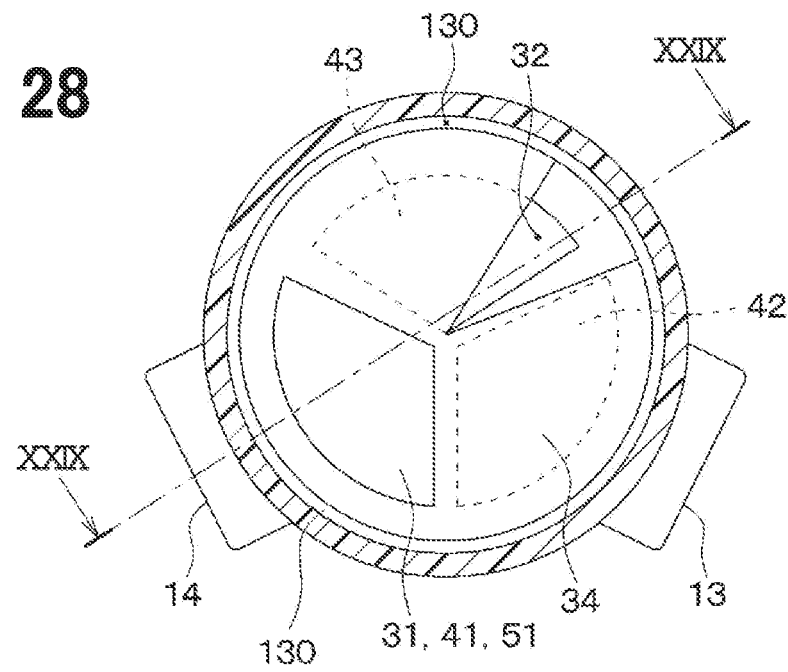
FIG. 28 is a cross-sectional view for assisting an explanation of the drive valve and a stationary valve in an inside of a housing of a valve device of the sixth embodiment while a drive shaft and a spring are omitted.
Figure 29:
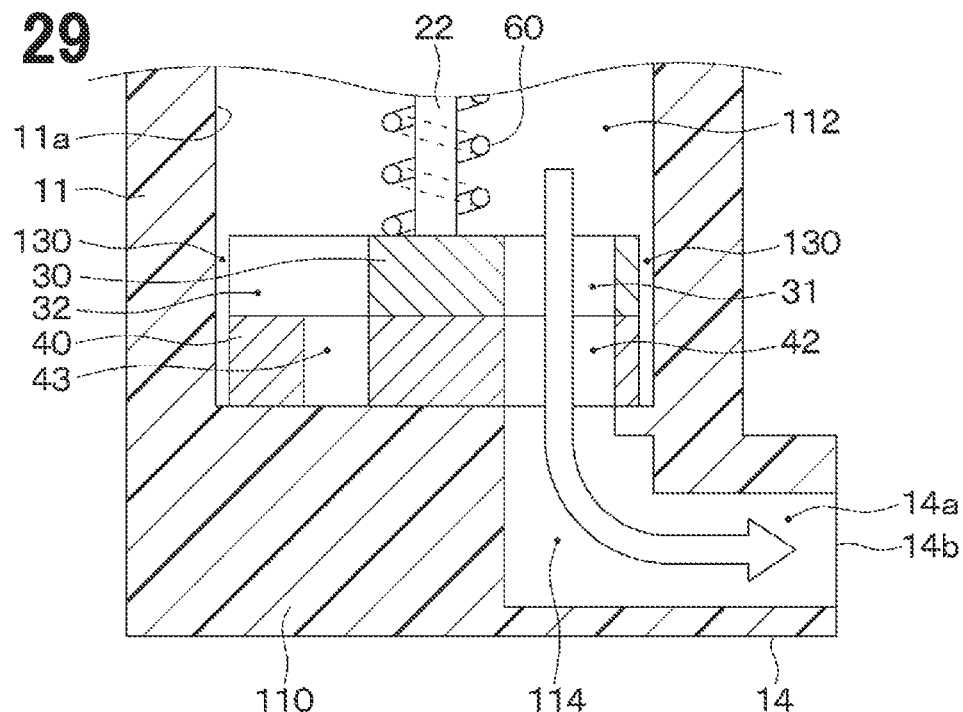
FIG. 29 is a cross-sectional view taken along line XXIX-XXIX in FIG. 28.

As shown in FIG. 25, the valve device of the present embodiment is configured such that the stationary valve 40 directly contacts the bottom portion 110 and the outer periphery support portion 11b of the housing main body 11.

Sixth Embodiment

In the first embodiment, there is described the example, in which the outer peripheral surface 33 covers the communication opening 32 of the drive valve 30 from the outer side in the radial direction of the axis S.

Alternative to this, a sixth embodiment, in which the communication opening 32 of the drive valve 30 is formed as a cutout hole that opens toward the outer side in the radial direction of the axis S, will be described with reference to FIGS. 26 to 29.

The communication opening 32 of the drive valve 30 of the present embodiment forms the cutout hole which extends through the drive valve 30 in the axial direction Sa and opens toward the outer side in the radial direction of the axis S.

According to the present embodiment described above, the drive valve 30 forms the passage opening 31 and the communication opening 32 while the passage opening 31 is communicated with at least one of the openings 41, 42 of the stationary valve 40. The communication opening 32 communicates between the opening 43 and the upstream passage 112.

Thereby, like in the first embodiment, it is possible to provide the valve device, in which the sealed region between the bottom portion 110 of the housing 10 and the drive valve 30 is eliminated.

In the present embodiment, as described above, the communication opening 32 of the drive valve 30 forms the cutout hole which extends through the drive valve 30 in the axial direction Sa and opens toward the outer side in the radial direction of the axis S.

Therefore, the surface area of the sliding surface of the drive valve 30 can be reduced in comparison to the first embodiment, in which there is used the drive valve 30 which is configured to cover the communication opening 32 from the outer side in the radial direction of the axis S. In this way, the frictional force between the drive valve 30 and the stationary valve 40 can be reduced.

In addition, in the present embodiment, the communication opening 32 of the drive valve 30 forms the cutout hole which opens toward the outer side in the radial direction of the axis S. Thus, the material of the drive valve 30 can be reduced in comparison to the first embodiment, and thereby the costs can be reduced.

Seventh Embodiment

In the first embodiment, there is described the example, in which the communication opening 32 of the drive valve 30 communicates between the opening 43 of the stationary valve 40 and the upstream passage 112.

Figure 30:
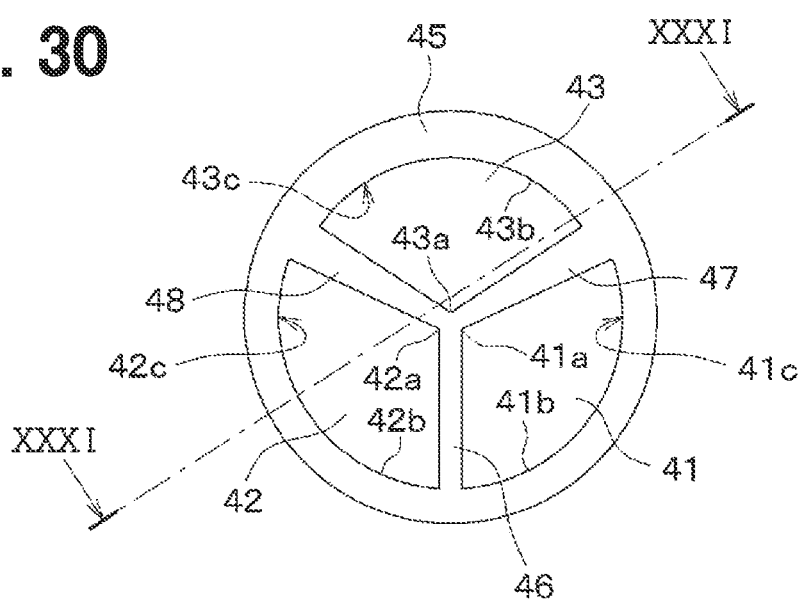
FIG. 30 is a front view of a drive valve of a seventh embodiment viewed from one side in the axial direction.
Figure 31:
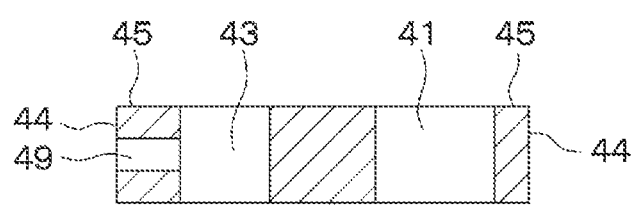
FIG. 31 is a cross-sectional view taken along line XXXI-XXXI in FIG. 30.
Figure 32:
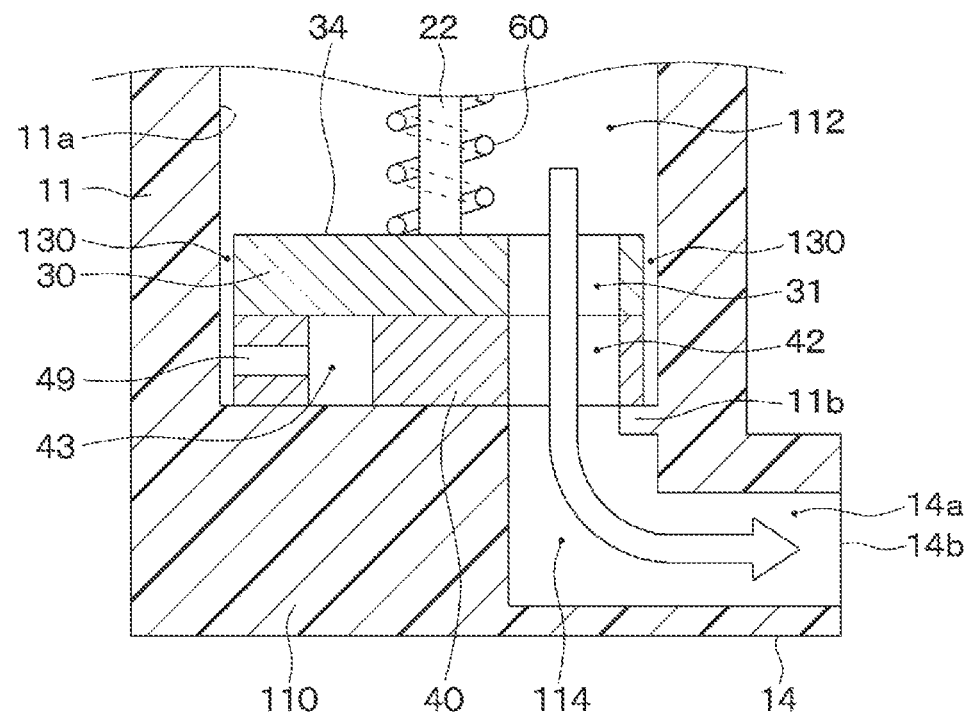
FIG. 32 is a cross-sectional view for assisting an explanation of the drive valve and a stationary valve in an inside of a housing of a valve device of the seventh embodiment, corresponding to FIG. 6 of the first embodiment.

Alternative to this, a seventh embodiment, in which the opening 43 of the stationary valve 40 and the upstream passage 112 are communicated with each other through a communication hole 49 of the stationary valve 40 and a gap 130, will be described with reference to FIGS. 30 to 32.

The communication hole 49 is a penetrating communication portion, which penetrates through the circular ring 45 of the stationary valve 40 from the opening 43 and opens outward in the radial direction of the axis S from the circular ring 45 of the stationary valve 40. The circular ring 45 of the stationary valve 40 is formed to cover the communication hole 49 from the one side and the other side of the communication hole 49 in the axial direction Sa.

The gap 130 is a communication gap which is formed between: the stationary valve 40 and the drive valve 30; and the inner wall 11a of the housing main body 11, such that the communication gap extends continuously all around the axis S in the circumferential direction of the axis S.

The communication gap 130 communicates between the communication hole 49 and the upstream passage 112. The gap 130 forms a communication passage which communicates between the opening 43 and the upstream passage 112 through the communication hole 49.

According to the present embodiment described above, the opening 43 of the stationary valve 40 and the upstream passage 112 are communicated with each other through the communication hole 49 of the stationary valve 40 and the gap 130.

Thereby, like in the first embodiment, it is possible to provide the valve device, in which the sealed region between the bottom portion 110 of the housing 10 and the drive valve 30 is eliminated.

In the present embodiment, as described above, the communication hole 49 penetrates through the circular ring 45 of the stationary valve 40 from the opening 43 and opens toward the outer side in the radial direction of the axis S from the circular ring 45 of the stationary valve 40. The circular ring 45 of the stationary valve 40 is formed to cover the communication hole 49 from the one side and the other side of the communication hole 49 in the axial direction Sa.

For this reason, the stationary valve 40 of the present embodiment is less likely to cause generation of the strain in the stationary valve 40 during the calcining process of the slurry in comparison to a stationary valve in which the communication hole 49 extends through the stationary valve in the axial direction Sa and is formed as a cutout hole that opens toward the outer side in the radial direction of the axis S.

Thus, the stationary valve 40 of the present embodiment will be less likely to have a variation in the position of the respective passage openings 41, 42, 43. Therefore, the flow rate control of the fluid, which flows in the corresponding opening 41, 42, can be performed with high precision.

Eighth Embodiment

In the first embodiment, there is described the example, in which the outer peripheral surface 44 covers the opening 43 of the stationary valve 40 from the outer side in the radial direction of the axis S.

Figure 33:
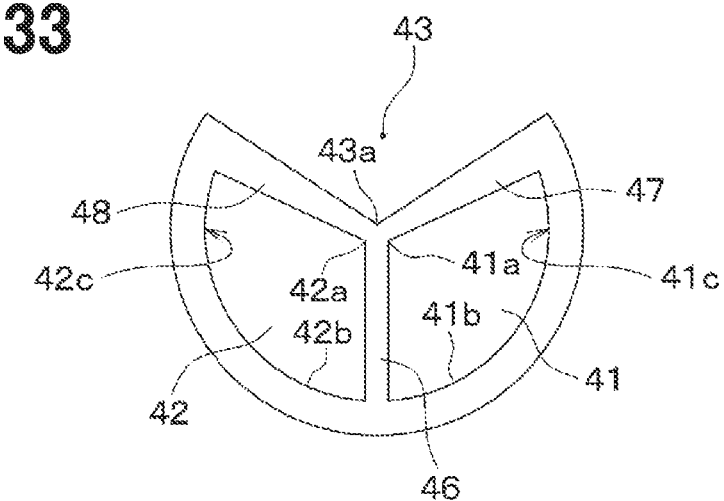
FIG. 33 is a front view of a stationary valve of an eighth embodiment viewed from the one side in the axial direction.
Figure 34:
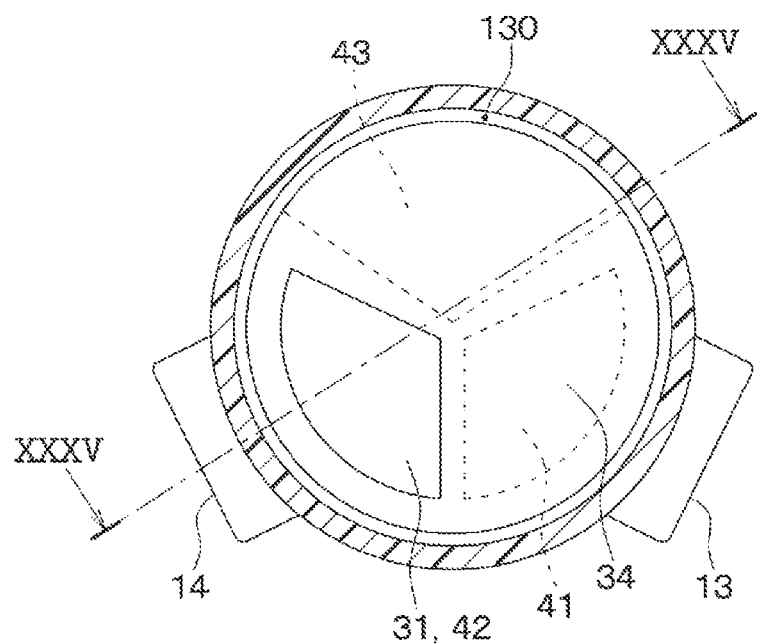
FIG. 34 is a cross-sectional view for assisting an explanation of a drive valve and the stationary valve at an inside of a housing of a valve device of the eighth embodiment while a drive shaft and a spring are omitted.
Figure 35:
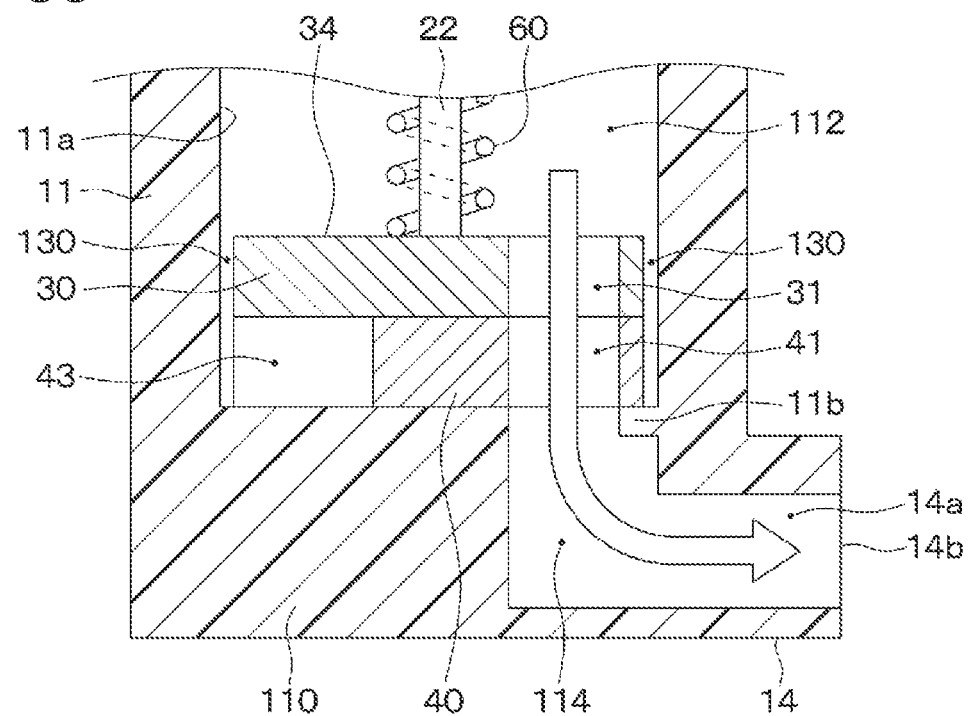
FIG. 35 is a cross-sectional view taken along line XXXV-XXXV in FIG. 34.

Alternative to this, an eighth embodiment, in which the opening 43 of the stationary valve 40 extends through the stationary valve 40 in the axial direction Sa and is formed as a cutout hole that opens toward the outer side in the radial direction of the axis S, will be described with reference to FIGS. 33 to 35.

The opening 43 of the stationary valve 40 of the present embodiment forms a penetrating chamber and is communicated with the upstream passage 112 through the gap 130. As shown in FIGS. 34 and 35, the gap 130 is formed between: the stationary valve 40 and the drive valve 30; and the inner wall 11a of the housing main body 11, such that the communication gap extends continuously all around the axis S in the circumferential direction of the axis S. The gap 130 communicates between the opening 43 and the upstream passage 112.

Thereby, like in the first embodiment, it is possible to provide the valve device, in which the sealed region between the bottom portion 110 of the housing 10 and the drive valve 30 is eliminated.

In the present embodiment, the opening 43 of the stationary valve 40 forms a cutout hole which extends through the stationary valve 40 in the axial direction Sa and opens toward the outer side in the radial direction of the axis S. Thereby, the surface area of the sliding surface of the stationary valve 40 can be reduced in comparison to the first embodiment, in which there is used the stationary valve 40 which is configured to cover the opening 43 from the outer side in the radial direction of the axis S. In this way, the frictional force between the drive valve 30 and the stationary valve 40 can be reduced.

In addition, in the present embodiment, the opening 43 of the stationary valve 40 forms the cutout hole which opens toward the outer side in the radial direction of the axis S. Thus, the material of the stationary valve 40 can be reduced in comparison to the first embodiment, and thereby the costs can be reduced.

Ninth Embodiment

Figure 36:
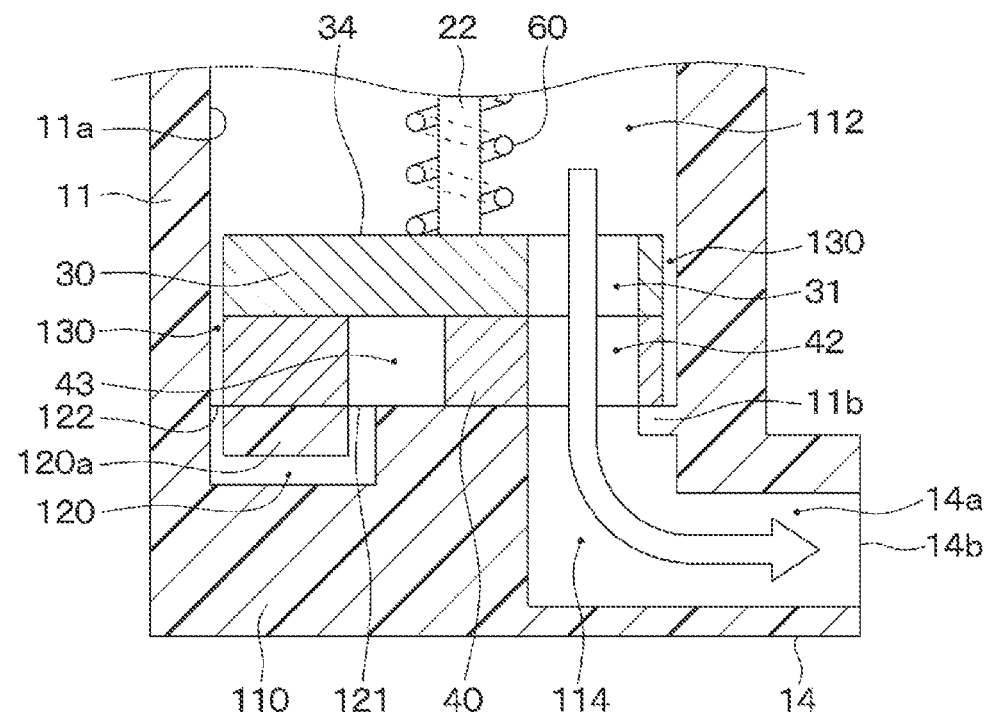
FIG. 36 is a cross-sectional view for assisting an explanation of a drive valve and a stationary valve in an inside of a housing of a valve device of a ninth embodiment, corresponding to FIG. 6 of the first embodiment.

In the first embodiment, there is described the example, in which the communication opening 32 of the drive valve 30 communicates between the opening 43 of the stationary valve 40 and the upstream passage 112. Alternative to this, a ninth embodiment, in which the opening 43 of the stationary valve 40 and the upstream passage 112 are communicated with each other through a communication hole 120 of the housing 10 and the gap 130, will be described with reference to FIG. 36.

The communication hole 120 of the housing 10 of the present embodiment is a penetrating communication portion which is formed at the bottom portion 110 and extends in the radial direction of the axis S. The communication hole 120 includes an opening 121, which opens toward the one side in the axial direction Sa at the opening 43, and an opening 122, which opens toward the one side in the axial direction Sa at the gap 130.

With this configuration, the communication hole 120 communicates between the opening 43 and the gap 130.

The gap 130 is formed between: the stationary valve 40 and the drive valve 30; and the inner wall 11a of the housing main body 11, such that the gap 130 extends continuously all around the axis S in the circumferential direction of the axis S. The gap 130 is the communication gap which communicates between the communication hole 120 and the upstream passage 112.

With this configuration, the inside of the opening 43 of the stationary valve 40 and the upstream passage 112 are communicated with each other through the communication hole 120 of the housing 10 and the gap 130.

In the present embodiment, a ceiling 120a, which covers the communication hole 120 of the housing 10 from the one side in the axial direction Sa, is formed at the bottom portion 110. The opening 121 is placed on the inner side of the ceiling 120a in the radial direction of the axis S. The opening 122 is placed on the outer side of the ceiling 120a in the radial direction of the axis S. The valve device of the present embodiment is a modification of the valve device of the first embodiment and has the communication hole 120 and the gap 130 in place of the communication opening 32 of the first embodiment, so that description of the remaining structure, which is other than the gap 130, will be omitted.

According to the present embodiment described above, in the valve device, the opening 43 of the stationary valve 40 and the upstream passage 112 are communicated with each other through the communication hole 120 of the housing 10 and the gap 130.

Thereby, like in the first embodiment, it is possible to provide the valve device, in which the sealed region between the bottom portion 110 of the housing 10 and the drive valve 30 is eliminated.

Tenth Embodiment

In the ninth embodiment, there is described the example, in which the ceiling 120a is formed to cover the communication hole 120 of the housing 10, which communicates between the opening 43 of the stationary valve 40 and the upstream passage 112, from the one side in the axial direction Sa.

Figure 37:
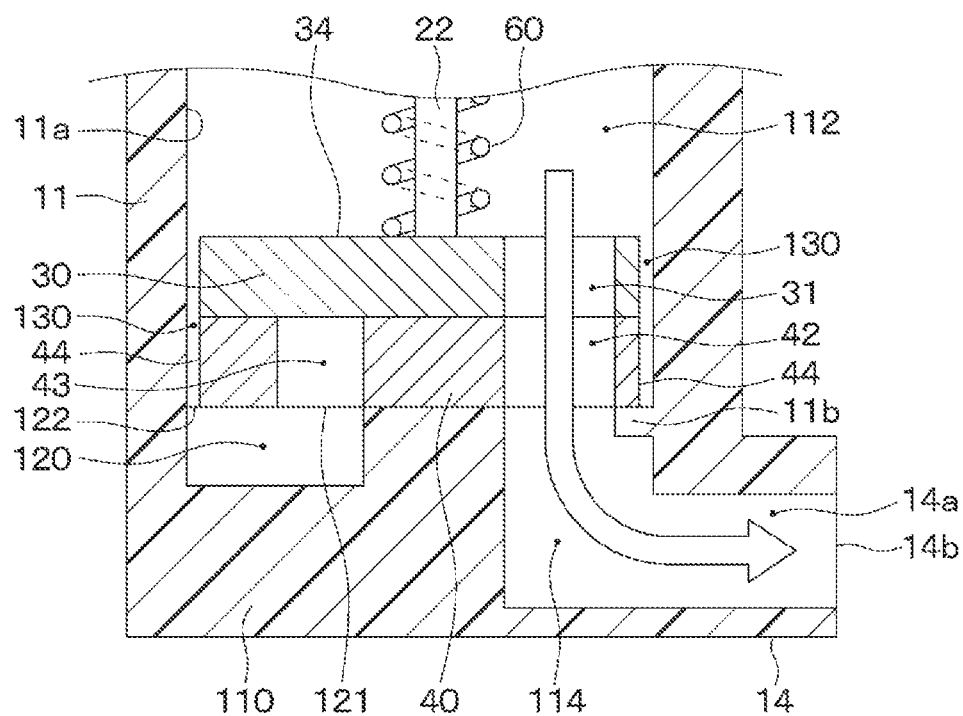
FIG. 37 is a cross-sectional view for assisting an explanation of a drive valve and a stationary valve in an inside of a housing of a valve device of a tenth embodiment, corresponding to FIG. 6 of the first embodiment.

Alternative to this, a tenth embodiment, in which the ceiling 120a for covering the communication hole 120 from the other side in the axial direction Sa is eliminated from the bottom portion 110 of the housing 10, will be described with reference to FIG. 37.

In the valve device of the present embodiment, like in the ninth embodiment, at the bottom portion 110, the communication hole 120 of the housing 10 includes the opening 121, which opens toward the one side in the axial direction Sa at the opening 43, and the opening 122, which opens toward the one side in the axial direction Sa at the gap 130.

In the present embodiment, the ceiling 120a, which covers the communication hole 120 from the one side in the axial direction Sa, is not formed. Therefore, the communication hole 120 opens from the bottom portion 110 of the housing 10 toward the one side in the axial direction Sa. Specifically, the communication hole 120 forms a cutout hole which opens from the bottom portion 110 of the housing 10 toward the one side in the axial direction Sa.

The gap 130 is formed between: the stationary valve 40 and the drive valve 30; and the inner wall 11a of the housing main body 11, such that the gap 130 extends continuously all around the axis S in the circumferential direction of the axis S. The gap 130 is the communication gap which communicates between the communication hole 120 and the upstream passage 112.

With this configuration, the opening 43 of the stationary valve 40 and the upstream passage 112 are communicated with each other through the communication hole 120 of the housing 10 and the gap 130.

According to the present embodiment described above, like in the ninth embodiment, in the valve device, the opening 43 of the stationary valve 40 and the upstream passage 112 are communicated with each other through the communication hole 120 of the housing 10 and the gap 130.

Thereby, it is possible to provide the valve device, in which the sealed region between the bottom portion 110 of the housing 10 and the drive valve 30 is eliminated.

Eleventh Embodiment

In the ninth embodiment, there is described the example, in which the opening 43 of the stationary valve 40 and the upstream passage 112 are communicated with each other through the communication hole 120 of the bottom portion 110 of the housing 10.

Figure 38:
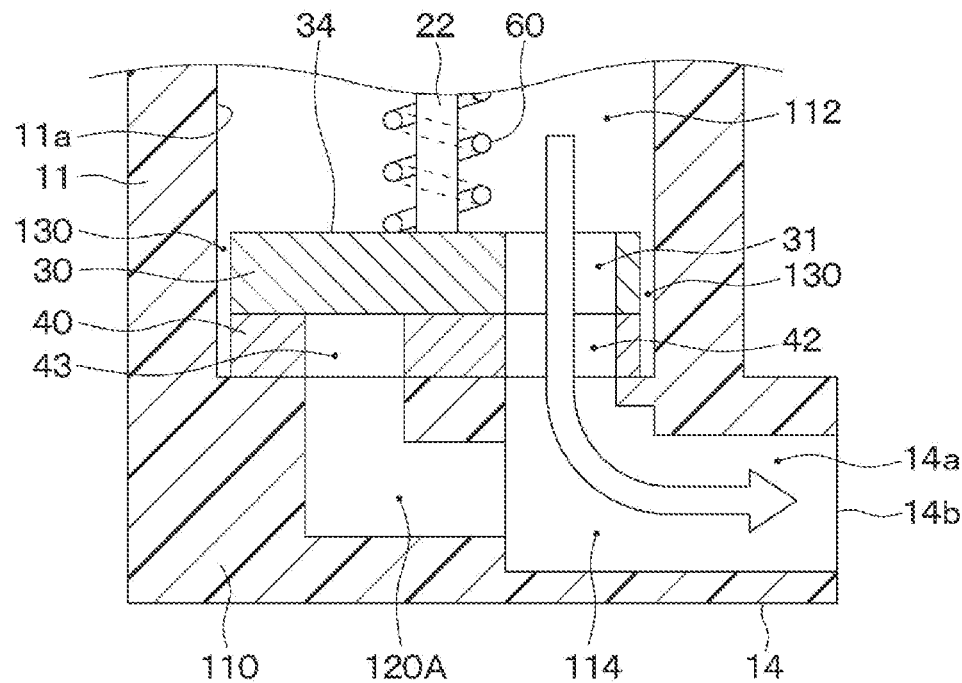
FIG. 38 is a cross-sectional view for assisting an explanation of a drive valve and a stationary valve at an inside of a housing of a valve device of an eleventh embodiment, corresponding to FIG. 6 of the first embodiment.

Alternative to this, an eleventh embodiment, in which the opening 43 of the stationary valve 40 and the downstream passage 114 are communicated with each other through a communication hole 120A, will be described with reference to FIG. 38.

In the valve device of the present embodiment, the communication hole 120A is provided in place of the communication hole 120 at the bottom portion 110 of the housing 10. The communication hole 120A communicates between the opening 43 and the downstream passage 114 among the downstream passages 113, 114.

The downstream passage 114 is a first downstream passage which is located on the downstream side of the drive valve 30 and the stationary valve 40 in the flow direction of the coolant in the coolant passage 111. The downstream passages 113, 114 are formed independently from each other at the bottom portion 110 of the housing 10.

Since the rest of the valve device of the present embodiment is the same as that of the valve device of the ninth embodiment except the communication hole 120A, description of the rest of the valve device of the present embodiment will be omitted.

Thereby, like in the first embodiment, it is possible to provide the valve device, in which the sealed region between the bottom portion 110 of the housing 10 and the drive valve 30 is eliminated.

Twelfth Embodiment

In the eleventh embodiment, there is described the example, in which the opening 43 of the stationary valve 40 and the downstream passage 114 are communicated with each other through the communication hole 120A.

Figure 39:
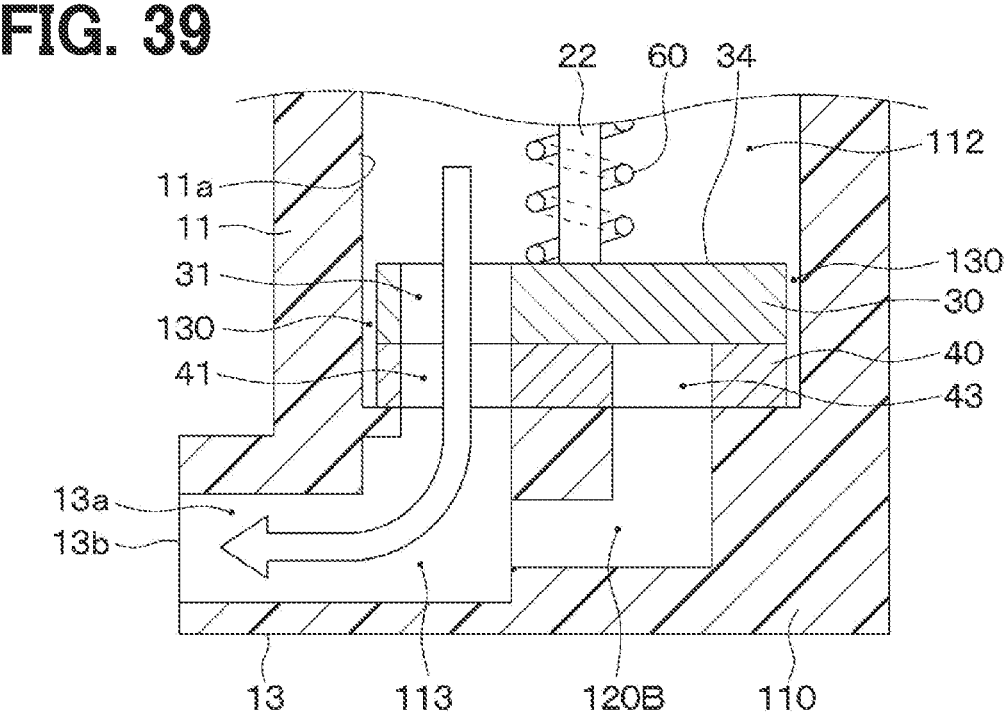
FIG. 39 is a cross-sectional view for assisting an explanation of a drive valve and a stationary valve at an inside of a housing of a valve device of a twelfth embodiment, corresponding to FIG. 6 of the first embodiment.

Alternative to this, a twelfth embodiment, in which the opening 43 of the stationary valve 40 and the downstream passage 113 are communicated with each other through a communication hole 120B, will be described with reference to FIG. 39.

In the valve device of the present embodiment, the communication hole 120B is provided in place of the communication hole 120A of the eleventh embodiment.

The communication hole 120B communicates between the opening 43 and the downstream passage 113 among the downstream passages 113, 114. The downstream passage 113 is a second downstream passage which is located on the downstream side of the drive valve 30 and the stationary valve 40 in the flow direction of the coolant in the coolant passage 111.

Since the rest of the valve device of the present embodiment is the same as that of the valve device of the eleventh embodiment except the communication hole 120B, description of the rest of the valve device of the present embodiment will be omitted.

Thereby, like in the eleventh embodiment, it is possible to provide the valve device, in which the sealed region between the bottom portion 110 of the housing 10 and the drive valve 30 is eliminated.

Other Embodiments (1) In the first to twelfth embodiments, there is described the example, in which the coolant is used as the fluid that is conducted through the valve device. Alternatively, any other fluid, which is other than the coolant, may be used as the fluid that is conducted through the valve device. For example, a liquid, which is other than the coolant, or a gas may be used as the other fluid.

(2) In the first to twelfth embodiments, there is described the example, in which the compression coil spring is used as the spring 60. Alternatively, any other resilient member, which is other than the compression coil spring, may be used as the spring 60.

The other resilient member may be one of various springs, such as a tension spring, a torsion coil spring, a thin-plate spring, a conical spring, a spiral spring, a flat spiral spring and a bond wire spring.

(3) In the first to twelfth embodiments, there is described the example, in which the two outlet ports, such as the outlet ports 14b, 13b, are provided at the housing 10. Alternatively, only one outlet port or three or more outlet ports may be formed at the housing 10.

(4) In the first to twelfth embodiments, there is described the example, in which the stationary valve 40 and the bottom portion 110 of the housing main body 11 are described as separate components. Alternatively, in a case where the gasket 50 is not provided, the stationary valve 40 and the bottom portion 110 of the housing main body 11 may be formed integrally in one-piece.

(5) In the first to twelfth embodiments, there is described the example, in which the drive valve 30 and the stationary valve 40 are made of the ceramic. Alternatively, the drive valve 30 and the stationary valve 40 may be made of a resin material.

(6) In the first to twelfth embodiments, there is described the example, in which the housing 10 is made of the resin material. Alternatively, the housing 10 may be made of a metal material or ceramic.

(7) In the fourth embodiment, there is described the example, in which the coil spring 80, which exerts the urging force Ka for urging the drive valve 30 toward the one side in the circumferential direction through the torsional resilient deformation, and the spring 60, which urges the drive valve 30 toward the other side in the axial direction Sa, are provided.

Alternatively, a resilient member, which exerts the urging force Ka for urging the drive valve 30 toward the one side in the circumferential direction through the torsional resilient deformation and urges the drive valve 30 toward the other side in the axial direction Sa, may be formed by one coil spring.

(8) The above embodiments are not unrelated to each other and can be appropriately combined unless the combination is clearly impossible. For example, it is possible to combine the second embodiment with any one or more of the first, and third to twelfth embodiments. Also, it is possible to combine the third embodiment with any one or more of the first, second, and fourth to twelfth embodiments.

It is possible to combine the fourth embodiment with any one or more of the first to third and fifth to twelfth embodiments, and it is possible to combine the fifth embodiment with any one or more of the first to fourth and sixth to twelfth embodiments. It is possible to combine the sixth embodiment with any one or more of the first to fifth and seventh to twelfth embodiments, and it is possible to combine the seventh embodiment with any one or more of the first to sixth and eighth to twelfth embodiments.

It is possible to combine the eighth embodiment with any one or more of the first to seventh and ninth to twelfth embodiments, and it is possible to combine the ninth embodiment with any one or more of the first to eighth and tenth to twelfth embodiments. It is possible to combine the tenth embodiment with any one or more of the first to ninth, eleventh and twelfth embodiments, and it is possible to combine the eleventh embodiment with any one or more of the first to tenth embodiments. It is possible to combine the twelfth embodiment with any one or more of the first to tenth Embodiments.

(9) The present disclosure is not limited to the above-described embodiments, and each of the above-described embodiments may be changed as appropriate within the scope of the present disclosure. Needless to say, in each of the above-described embodiments, the elements of the embodiment are not necessarily essential except when it is clearly indicated that they are essential and when they are clearly considered to be essential in principle. In each of the above embodiments, when a numerical value such as the number, numerical value, amount, range or the like of the constituent elements of the embodiment is mentioned, the present disclosure should not be limited to such a numerical value unless it is clearly stated that it is essential and/or it is required in principle. In each of the above embodiments, when the shape, the positional relationship or the like of the constituent elements of the embodiment are mentioned, the present disclosure should not be limited the shape, the positional relationship or the like unless it is clearly stated that it is essential and/or it is required in principle. Furthermore, in each of the above embodiments, if there is recited that an external environmental information of the vehicle (e.g., the humidity outside the vehicle) is to be obtained from a sensor, it is also possible to eliminate the sensor and receive the external environmental information from an external server or a cloud outside the vehicle. Alternatively, the sensor may be eliminated, and relevant information, which relates to the external environmental information received from the external server or the cloud outside the vehicle, may be obtained, and the external environmental information may be estimated from the acquired relevant information.

What is claimed is:

1. A valve device comprising:
a housing that forms a fluid passage configured to conduct fluid;
a stationary valve that is placed in the fluid passage and has an axis while an extending direction of the axis is defined as an axial direction, wherein the stationary valve forms a first passage, which is configured to conduct the fluid, and a penetrating chamber which penetrates through the stationary valve in the axial direction; and
a drive valve that is placed on one axial side of the stationary valve in the axial direction in the fluid passage and forms a second passage which is configured to conduct the fluid, wherein the drive valve is configured to communicate the second passage to the first passage through rotation of the drive valve about the axis while the drive valve slides relative to the stationary valve, wherein:
the housing has a bottom portion that is configured to cover the penetrating chamber from another axial side in the axial direction; and
an upstream passage of the fluid passage, which is located on an upstream side of the drive valve and the stationary valve in a flow direction of the fluid, is communicated with the penetrating chamber through a communication passage.

2. The valve device according to claim 1, wherein:
the communication passage extends through the drive valve from the penetrating chamber and opens from the drive valve on the one axial side in the axial direction; and
the drive valve has an outer peripheral portion that is configured to cover the communication passage from a radially outer side of the communication passage in a radial direction of the axis.

3. The valve device according to claim 1, wherein the communication passage extends from the penetrating chamber through the drive valve in the axial direction and forms a cutout hole which outwardly opens from the drive valve in a radial direction of the axis.

4. The valve device according to claim 1, wherein the penetrating chamber extends through the stationary valve in the axial direction and forms a cutout hole which outwardly opens from the stationary valve in a radial direction of the axis.

5. The valve device according to claim 4, wherein:
the housing has an inner wall which forms the fluid passage; and
the communication passage includes a communication gap that is formed between:
the drive valve and the stationary valve; and
the inner wall, wherein the communication gap communicates between the penetrating chamber and the upstream passage.

6. The valve device according to claim 1, wherein the communication passage includes a penetrating communication portion that penetrates through the stationary valve from the penetrating chamber and radially outwardly opens from the stationary valve in a radial direction of the axis.

7. The valve device according to claim 1, wherein the communication passage includes a penetrating communication portion that is formed at the bottom portion and communicates between the penetrating chamber and the upstream passage.

8. The valve device according to claim 7, wherein the penetrating communication portion forms a cutout hole that opens from the bottom portion on the one axial side in the axial direction.

9. The valve device according to claim 6, wherein:
the housing has an inner wall which forms the fluid passage; and
the communication passage includes a communication gap that is formed between:
the drive valve and the stationary valve; and
the inner wall, wherein the communication gap communicates between the penetrating communication portion and the upstream passage.

10. The valve device according to claim 1, comprising a pushing member that is placed in the fluid passage and is configured to push the drive valve toward the another axial side in the axial direction.

11. The valve device according to claim 10, wherein the pushing member is a compression spring that is configured to generate a resilient force which pushes the drive valve toward the another axial side in the axial direction.

12. The valve device according to claim 1, comprising:
an actuator that is configured to generate a rotational force;
a gear mechanism that includes a plurality of gears and is configured to transmit the rotational force of the actuator to the drive valve through the plurality of gears which are meshed one another; and
an urging member that is configured to urge the drive valve toward one circumferential side in a circumferential direction about the axis, wherein:
the drive valve is configured to be rotated by the rotational force transmitted from the gear mechanism while the drive valve is urged by the urging member.

13. The valve device according to claim 1, comprising a seal member that is configured to seal between the stationary valve and the bottom portion.

14. A valve device comprising:
a housing that forms a fluid passage configured to conduct fluid;
a stationary valve that is placed in the fluid passage and has an axis while an extending direction of the axis is defined as an axial direction, wherein the stationary valve forms a first passage, which is configured to conduct the fluid, and a penetrating chamber which penetrates through the stationary valve in the axial direction; and
a drive valve that is placed on one axial side of the stationary valve in the axial direction in the fluid passage and forms a second passage which is configured to conduct the fluid, wherein the drive valve is configured to communicate the second passage to the first passage through rotation of the drive valve about the axis while the drive valve slides relative to the stationary valve, wherein:

the housing has a bottom portion that is configured to cover the penetrating chamber from another axial side in the axial direction; and a downstream passage of the fluid passage, which is located on a downstream side of the drive valve and the stationary valve in a flow direction of the fluid, is communicated with the penetrating chamber through a communication passage.

15. The valve device according to claim 14, wherein:

the first passage is a first stationary-side passage, and the stationary valve forms a second stationary-side passage which is configured to conduct the fluid;

the drive valve is configured to communicate the second passage to one of the first stationary-side passage and the second stationary-side passage through rotation of the drive valve about the axis while the drive valve slides relative to the stationary valve;

the fluid passage includes:
- a first downstream passage, which is configured to conduct the fluid that is passed through the first stationary-side passage; and
- a second downstream passage, which is formed independently from the first downstream passage and is configured to conduct the fluid that is passed through the second stationary-side passage; and only one of the first downstream passage and the second downstream passage is communicated with the penetrating chamber through the communication passage.

16. The valve device according to claim 14, comprising a pushing member that is placed in the fluid passage and is configured to push the drive valve toward the another axial side in the axial direction.

17. The valve device according to claim 16, wherein the pushing member is a compression spring that is configured to generate a resilient force which pushes the drive valve toward the another axial side in the axial direction.

18. The valve device according to claim 14, comprising:
an actuator that is configured to generate a rotational force;
a gear mechanism that includes a plurality of gears and is configured to transmit the rotational force of the actuator to the drive valve through the plurality of gears which are meshed one another; and
an urging member that is configured to urge the drive valve toward one circumferential side in a circumferential direction about the axis, wherein:
the drive valve is configured to be rotated by the rotational force transmitted from the gear mechanism while the drive valve is urged by the urging member.

19. The valve device according to claim 14, comprising a seal member that is configured to seal between the stationary valve and the bottom portion.

* * * * *